(12) United States Patent
Sbragia et al.

(10) Patent No.: US 10,709,969 B2
(45) Date of Patent: Jul. 14, 2020

(54) GAME SYSTEM WITH GAME MACHINE EXECUTING A GAME PROGRAM THAT RECEIVES INPUTS AND OUTPUTS CONTROL SIGNALS TO A GAME CONTROLLER

(71) Applicant: Diversified Healthcare Development, LLC, Fallbrook, CA (US)

(72) Inventors: Dean G. Sbragia, Fallbrook, CA (US); John F. Byrd, Independence, VA (US)

(73) Assignee: Diversified Healthcare Development, LLC, Fallbrook, CA (US)

( * ) Notice: Subject to any disclaimer, the term of this patent is extended or adjusted under 35 U.S.C. 154(b) by 51 days.

(21) Appl. No.: 16/221,978

(22) Filed: Dec. 17, 2018

(65) Prior Publication Data

US 2020/0188775 A1 Jun. 18, 2020

(51) Int. Cl.
*A63F 13/214* (2014.01)
*A63F 13/218* (2014.01)
*A63F 13/211* (2014.01)

(52) U.S. Cl.
CPC .......... *A63F 13/214* (2014.09); *A63F 13/211* (2014.09); *A63F 13/218* (2014.09)

(58) Field of Classification Search
USPC .......................................................... 463/36
See application file for complete search history.

(56) References Cited

U.S. PATENT DOCUMENTS

| | | | | |
|---|---|---|---|---|
| 6,543,769 | B1 * | 4/2003 | Podoloff | A63B 21/0004 273/148 B |
| 8,100,770 | B2 | 1/2012 | Yamazaki et al. | |
| 8,131,498 | B1 * | 3/2012 | McCauley | A61B 5/1036 177/144 |
| 2011/0281650 | A1 * | 11/2011 | Yamazaki | G01G 19/44 463/36 |
| 2012/0231931 | A1 | 9/2012 | Luberski et al. | |
| 2014/0235325 | A1 * | 8/2014 | Merati | G07F 17/3244 463/25 |
| 2018/0085044 | A1 | 3/2018 | Sbragia et al. | |

OTHER PUBLICATIONS

A Korebalance® Catalog (medicalfitsolutions.com/index_htm_files/KB%20catalog.pdf, Oct. 27, 2015).

* cited by examiner

*Primary Examiner* — Pierre E Elisca
(74) *Attorney, Agent, or Firm* — Gibb & Riley, LLC

(57) ABSTRACT

A game system including a game controller and game machine that executes a game program. The game controller including a balance platform supported at its center and under its periphery by an inflatable bladder, an air pressure source, a dual-axis accelerometer measuring tilt of the balance platform, a control valve, and an air pressure sensor measuring air pressure of the inflatable bladder. The game machine receives real time measures of the air pressure of the inflatable bladder and the tilt of the balance platform, displays on a screen a game player's location in a game space generated by the game program, based on the measures of the tilt, and changes the air pressure of the inflatable bladder during game play in response to the game program generating an interaction between the game player's location and a location of an interactive graphic image created by the game program.

20 Claims, 21 Drawing Sheets

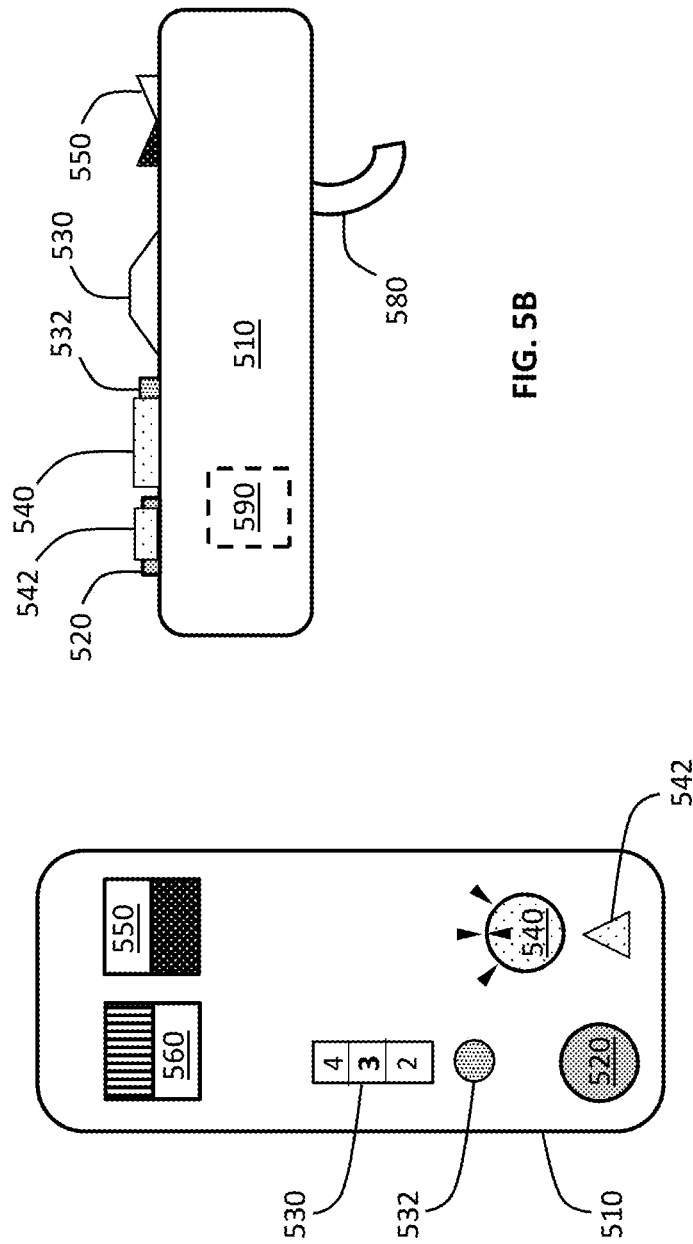

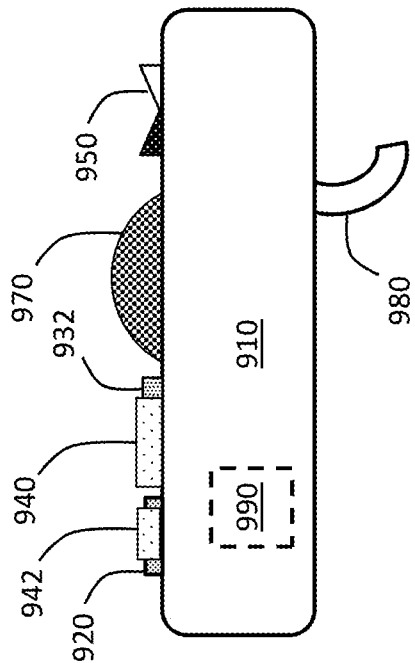
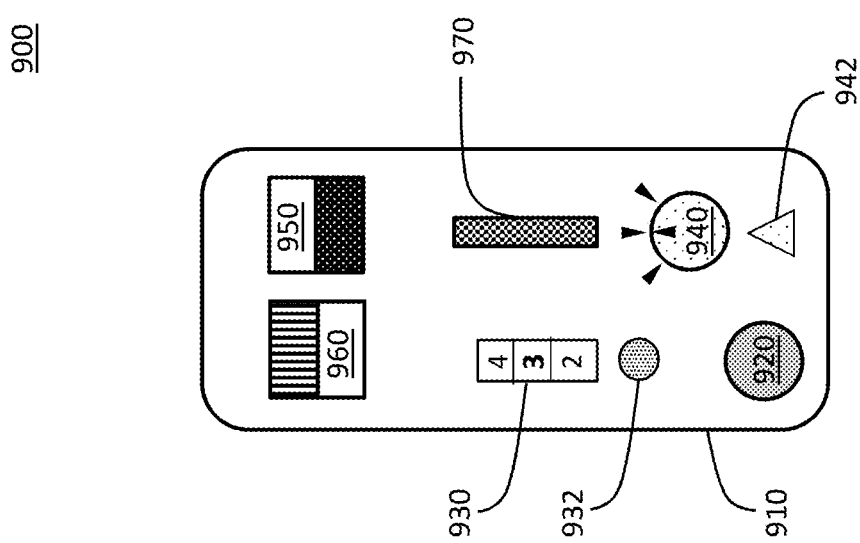
FIG. 9B
FIG. 9A

GAME SYSTEM WITH GAME MACHINE EXECUTING A GAME PROGRAM THAT RECEIVES INPUTS AND OUTPUTS CONTROL SIGNALS TO A GAME CONTROLLER

BACKGROUND

Field of the Invention

The present invention relates to a game system including a game controller and a game machine that executes a game program. In particular, the game controller includes a balance platform upon which a game player stands. More particularly, movements by the game player on the balance platform provide real time tilt data to the game program. Game play results from input of the real time tilt data to the game program. The game program outputs control signals to the game controller based on the game play. The game player views the game play on a display screen of the game machine.

Description of Related Art

U.S. Patent Application Publication 2012/0231931 A1 discloses a system and method of balance training. The system responds to movement of a user standing on a balance platform, supported at its center by a ball joint, by tilting in a direction of the horizontal plane. An inflatable bladder encircles the central ball joint and supports the balance platform under its periphery. Inflation of the inflatable bladder restrains tilting of the balance platform, giving greater stability to the balance platform, while deflation of the inflatable bladder facilitates tilting of the balance platform, giving lesser stability to the balance platform. A computer is connected to an air pressure sensor that measures a real time air pressure of the inflatable bladder. During balance training, an air pressure value may be entered into the computer by a clinician or user to either increase or decrease the stability of the balance platform, by increasing or decreasing the air pressure of the inflatable bladder, respectively. To increase air pressure within the inflatable bladder, the computer activates an air pump, forcing air into the inflatable bladder, while to decrease air pressure the computer vents the inflatable bladder to the atmosphere via a control valve.

The system of balance training includes a tilt sensor that measures, in real time, the number of degrees of tilting of the balance platform about its longitudinal axis, i.e., left/right tilting, and about its transverse axis, i.e., forward/back tilting. Both degrees of tilt are transmitted from the tilt sensor to the computer of the balance training system and are displayed on a monitor in real time. The outputs of the tilt sensor resulting from movements by the user on the balance platform, i.e., the degrees of left/right tilting and forward/back tilting, may be likened to the outputs of a joystick that is used to navigate a cursor displayed by a monitor through a 2-dimensional maze.

A Korebalance® catalog (medicalfitsolutions.com/index_htm_files/KB %20catalog.pdf, Oct. 27, 2015) further discloses a version of the balance training system that may transmit left/right movements of the user on the balance platform, i.e., left or right tilts, to left/right steering inputs of a computer game, for example, a racing simulation game, e.g., Tux Racer or SuperTuxKart, while forward/back movements of the user, i.e., forward or back tilts, may be transmitted to the accelerating/braking inputs of the racing simulation game. Alternatively, left/right and up/down outputs of the tilt sensor may be used by the computer game to generate a tilting game surface displayed by the monitor for a golf game, e.g., Neverball or Neverputt, so as to roll a ball on the tilting game surface through an obstacle course. Before playing these games, the user sets the difficulty of gameplay by entering an air pressure value into the system, so as to increase or decrease the air pressure of the inflatable bladder and thus, to increase or decrease the stability of the balance platform, respectively.

U.S. Patent Application No. 2018/0085044 A1 discloses additional features of a system for the clinical assessment of balance on a balance platform with controlled stability. Rather than using an air pump to directly inflate an toroidal bladder supporting the balance platform, this system may include a high air pressure reservoir to more rapidly inflate the toroidal bladder during clinical tests, so as to decrease the time required for a clinical test. This clinical balance assessment system may also utilize a method whereby various types of clinical tests for the assessment of balance are performed using a predetermined and preprogrammed sequence of binary questions that are presented to the clinician on a display screen. Affirmative or negative responses to the sequence of binary questions entered into the computer by the clinician may then result in either automatically increasing or decreasing the air pressure of the inflatable bladder to a predetermined and preprogrammed target air pressure corresponding to particular type of clinical test. Another embodiment of the system for the clinical assessment of balance includes a balance platform comprising an upper platform, a lower platform, and a load cell sandwiched between the upper platform and the lower platform. Prior to a clinical test based on tilt information, a sensed load from the load cell, i.e., the user's weight, may be used to proportionately change a predetermined and preprogrammed target air pressure or an air pressure value entered into the computer by a clinician for the clinical test, so as to provide a comparable degree of stability to the balance platform across subjects of various weights. Yet another embodiment of the clinical balance system includes a balance platform comprising an upper platform, a lower platform, and an array of force transducers sandwiched between the upper platform and the lower platform. After deactivating the inclinometer, the array of force transducers may be activated to perform a clinical test based only on a subject's Center of Pressure on a stable balance platform, i.e., a balance platform supported by the toroidal bladder when it is inflated to its maximum inflationary air pressure, so as to prevent tilting of the balance platform. Subsequent deactivation of the array of force transducers and activation of the inclinometer would allow the system to revert to a system for the clinical assessment of balance utilizing tilt information from a balance platform.

U.S. Pat. No. 8,100,770 B2 discloses a game controller, a storage medium storing a game program, and a game apparatus. The game controller includes a rigid square support plate on which a game player stands. The game controller is placed on the floor with one edge of the square support plate parallel to and close to a video monitor of a game machine. Four load sensors are disposed under the corners of the square support plate. In four-directional moving games where the game player faces the video monitor, upward movement of a game character on the video monitor results from a forward displacement of the game player's Barycenter, or Center of Gravity, on the square support plate, while a downward movement of the game character on the video monitor results from a backward displacement of the game player's Barycenter on the square support plate. Similarly, as viewed by the game player when facing the video monitor, a leftward movement of the game character on the video monitor results from a leftward displacement of the game player's Barycenter on the square support plate, while a rightward movement of the game character on the video monitor results from a rightward displacement of the game player's Barycenter on the square support plate.

In a four-directional moving game, each of the four load sensors—upper-left, upper-right, lower-left, and lower-right—are related to directions of movement by the game character according to their respective load detection values. A processor computes an upper load value based on a sum of the upper-left and upper-right load detection values and a lower load value based on a sum of the lower-left and lower-right load detection values. Similarly, a left load value is based on a sum of the upper-left and lower-left load detection values and a right load value is based on a sum of the upper-right and lower-right load detection values.

In one type of a four-directional moving game, game character movement on the video monitor is determined solely by the maximum value of the four-directional load values. For example, if the upper load value is the maximum value, then the direction of the character's movement on the monitor is upward and the magnitude of the upward movement is based on the value of the maximal upper load value. Similarly, a maximal lower load value results in the character's downward movement on the video monitor by a magnitude based on the value of the maximal lower load value; a maximal left load value results in the character's leftward movement on the video monitor by a magnitude based on the value of the maximal left load value; and a maximal right load value results in the character's rightward movement on the video monitor by a magnitude based on the value of the maximal right load value.

In another type of a four-directional moving game, a computed difference between the upper load value and the lower load value provides a vertical difference value relative to the center of the rigid square support plate, while a computed difference between the left load value and the right load value provides a horizontal difference value relative to the center of the square support plate. X and Y coordinates of the game player's Barycenter with respect to the center of the square support plate are computed from the vertical and the horizontal difference values. A vector from the center of the square support plate to the X and Y coordinates of the game player's Barycenter determines the direction of movement for the game player on the video monitor, while the magnitude of the vector is used to compute the movement speed of the game player on the video monitor.

SUMMARY

In view of the foregoing, embodiments of the disclosure may provide a game system including at least a game controller and a game machine that executes a game program. The game controller may include a balance platform supported at its center and under its periphery by an inflatable bladder, an air pressure source, a dual-axis accelerometer that measures tilt of the balance platform about its transverse x-axis and its longitudinal y-axis, a control valve for inflating or deflating the inflatable bladder, and an air pressure sensor that measures the air pressure of the inflatable bladder. The game machine may receive real time measures of the air pressure from the air pressure sensor and of the tilt of the balance platform from the dual-axis accelerometer. The game machine may display on its screen a game player's location in a game space generated by the game program.

Unlike conventional video balance games, the game machine of embodiments of the invention may change the air pressure of the inflatable bladder during game play—thus, increasing or decreasing the stability of the balance platform—in response to the game program generating an interaction between the game player's location in the game space and a location of an interactive graphic image created by the game program.

An embodiment of the disclosure may describe a game system including a game controller and a game machine. The game controller may include: a balance platform supported under its center, where the balance platform may tilt in all directions of the horizontal plane in response to changes to a center of pressure caused by a game player balancing on the balance platform; an inflatable bladder supporting the balance platform under its periphery; an air pressure source controllably inflating the inflatable bladder; a dual-axis accelerometer measuring tilt of the balance platform in real time; a control valve controllably connecting one of: an air pressure source and the inflatable bladder, and the inflatable bladder and the atmosphere; and an air pressure sensor measuring air pressure of the inflatable bladder in real time. The game machine may include: a screen, and a central processor that executes a game program, which receives measures of the air pressure of the inflatable bladder from the air pressure sensor and the tilt of the balance platform from the dual-axis accelerometer, displays on the screen a game player's location in a game space based on measures of the tilt, and controllably changes the air pressure of the inflatable bladder by the control valve during game play in response to the game program generating an interaction between the game player's location and a location of an interactive graphic image created by the game program. The game program may transmit to the game controller one of: first control signals for a first interaction that generate a positive change to the air pressure by opening the control valve between the air pressure source and the inflatable bladder, inflating the inflatable bladder and increasing stability of the balance platform, and closing the control valve between the air pressure source and the inflatable bladder when the positive change to the air pressure is effected, as measured by the air pressure sensor; and second control signals for a second interaction that generate a negative change to the air pressure by opening the control valve between the inflatable bladder and the atmosphere, deflating the inflatable bladder and decreasing the stability of the balance platform, and closing the control valve between the inflatable bladder and the atmosphere when the negative change to the air pressure is effected, as measured by the air pressure sensor.

Another embodiment of the disclosure may describe a game system including a game controller, a remote game controller with speed control, and a game machine. The game controller may include: a balance platform supported under its center, where the balance platform may tilt in all directions of the horizontal plane in response to changes to a center of pressure caused by a game player balancing on the balance platform; an inflatable bladder supporting the balance platform under its periphery; an air pressure source controllably inflating the inflatable bladder; a dual-axis accelerometer measuring tilt of the balance platform in real time; a control valve controllably connecting one of: an air pressure source and the inflatable bladder, and the inflatable bladder and the atmosphere; and an air pressure sensor measuring air pressure of the inflatable bladder in real time. The remote game controller may be held in hand by the game player and may include a game player-controlled variable speed control that operates in real time. The game machine may include: a screen, and a central processor that executes a game program, which receives real time measures of the air pressure of the inflatable bladder from the air pressure sensor, the tilt of the balance platform from the dual-axis accelerometer, and a game player-controlled variable speed from the game player-controlled variable speed control. The game program may display on the screen a game player's location in a 3-dimensional (3D) game space based on measures of the tilt and of the game player-controlled variable speed, and controllably change the air pressure of the inflatable bladder by the control valve during game play in response to the game program generating an interaction between the game player's location and a location of an interactive graphic image created by the game program. The game program may transmit to the game controller one of: first control signals for a first interaction that generate a positive change to the air pressure by opening the control valve between the air pressure source and the inflatable bladder, inflating the inflatable bladder and increasing stability of the balance platform, and closing the control valve between the air pressure source and the inflatable bladder when the positive change to the air pressure is effected, as measured by the air pressure sensor; and second control signals for a second interaction that generate a negative change to the air pressure by opening the control valve between the inflatable bladder and the atmosphere, deflating the inflatable bladder and decreasing the stability of the balance platform, and closing the control valve between the inflatable bladder and the atmosphere when the negative change to the air pressure is effected, as measured by the air pressure sensor.

Yet another embodiment of the disclosure may describe a game system including a game controller and a game machine. The game controller may include: a balance platform supported under its center, where the balance platform may tilt in all directions of the horizontal plane in response to changes to a center of pressure caused by a game player balancing on the balance platform. The balance platform may include an upper layer, a lower layer, and a load cell sandwiched between the upper layer and the lower layer. The game controller may further include: an inflatable bladder supporting the balance platform under its periphery; an air pressure source controllably inflating the inflatable bladder; a dual-axis accelerometer measuring tilt of the balance platform in real time; a control valve controllably connecting one of: an air pressure source and the inflatable bladder, and the inflatable bladder and the atmosphere; an air pressure sensor measuring air pressure of the inflatable bladder in real time; and the load cell that measures a load on the balance platform resulting from the game player balancing on the balance platform in real time. The game machine may include a screen and a central processor that executes a game program, which receives real time measures of the air pressure of the inflatable bladder from the air pressure sensor, the tilt of the balance platform from the dual-axis accelerometer, and the load on the balance platform from the load cell. The game program may display on the screen a game player's location in a game space based on measures of the tilt, and controllably change the air pressure of the inflatable bladder by a proportional load factor, based on the load of the game player prior to game play, via the control valve during game play in response to the game program generating an interaction between the game player's location and a location of an interactive graphic image created by the game program. The game program may transmit to the game controller one of: first control signals for a first interaction that generate a positive change to the air pressure, based on the proportional load factor, by opening the control valve between the air pressure source and the inflatable bladder, inflating the inflatable bladder and increasing stability of the balance platform, and closing the control valve between the air pressure source and the inflatable bladder when the positive change to the air pressure, based on the proportional load factor, is effected, as measured by the air pressure sensor; and second control signals for a second interaction that generate a negative change to the air pressure, based on the proportional load factor, by opening the control valve between the inflatable bladder and the atmosphere, deflating the inflatable bladder and decreasing the stability of the balance platform, and closing the control valve between the inflatable bladder and the atmosphere when the negative change to the air pressure, based on the proportional load factor, is effected, as measured by the air pressure sensor.

Yet another embodiment of the disclosure may describe a game system including a game controller, a remote game controller with speed control, and a game machine. The game controller may include a balance platform supported under its center, where the balance platform tilts in all directions of the horizontal plane in response to changes to a center of pressure caused by a game player balancing on the balance platform. The balance platform may include an upper layer, a lower layer, and a load cell sandwiched between the upper layer and the lower layer. The game controller may further include: an inflatable bladder supporting the balance platform under its periphery; an air pressure source controllably inflating the inflatable bladder; a dual-axis accelerometer measuring tilt of the balance platform in real time; a control valve controllably connecting one of: an air pressure source and the inflatable bladder, and the inflatable bladder and the atmosphere; an air pressure sensor measuring air pressure of the inflatable bladder in real time; and the load cell that measures a load on the balance platform resulting from the game player balancing on the balance platform in real time. The remote game controller may be held in hand by the game player and may include a game player-controlled variable speed control that operates in real time. The game machine may include: a screen, and a central processor that executes a game program, which receives real time measures of the air pressure of the inflatable bladder from the air pressure sensor, the tilt of the balance platform from the dual-axis accelerometer, the load on the balance platform from the load cell, and a game player-controlled variable speed from the game player-controlled variable speed control. The game program may display on the screen a game player's location in a 3-dimensional (3D) game space based on measures of the tilt and of the game player-controlled variable speed, and may controllably change the air pressure of the inflatable bladder by a proportional load factor, based on the load of the game player prior to game play, via the control valve during game play in response to the game program generating an interaction between the game player's location and a location of an interactive graphic image created by the game program. The game program may transmit to the game controller one of: first control signals for a first interaction that generate a positive change to the air pressure, based on the proportional load factor, by opening the control valve between the air pressure source and the inflatable bladder, inflating the inflatable bladder and increasing stability of the balance platform, and closing the control valve between the air pressure source and the inflatable bladder when the positive change to the air pressure, based on the proportional load factor, is effected, as measured by the air pressure sensor; and second control signals for a second interaction that generate a negative change to the air pressure, based on the proportional load factor, by opening the control valve between the inflatable bladder and the atmosphere, deflating the inflatable bladder and decreasing the stability of the balance platform, and closing the control valve between the inflatable bladder and the atmosphere when the negative change to the air pressure, based on the proportional load factor, is effected, as measured by the air pressure sensor.

BRIEF DESCRIPTION OF THE DRAWINGS

The embodiments herein will be better understood from the followings detailed descriptions with reference to the drawing, which are not necessarily drawn to scale and in which:

FIG. 5A is schematic diagram illustrating an upper surface of a remote game controller 500 for the game system 100 in an embodiment of the invention;

FIG. 5B is a schematic diagram illustrating a side view of the remote game controller 500 for the game system 100 in an embodiment of the invention;

FIG. 9A is schematic diagram illustrating an upper surface of the remote game controller with speed control 900 of the game system 700 in an embodiment of the invention;

FIG. 9B is schematic diagram illustrating a side view of the remote game controller with speed control 900 of the game system 700 in an embodiment of the invention;

DETAILED DESCRIPTION

Figure 1:
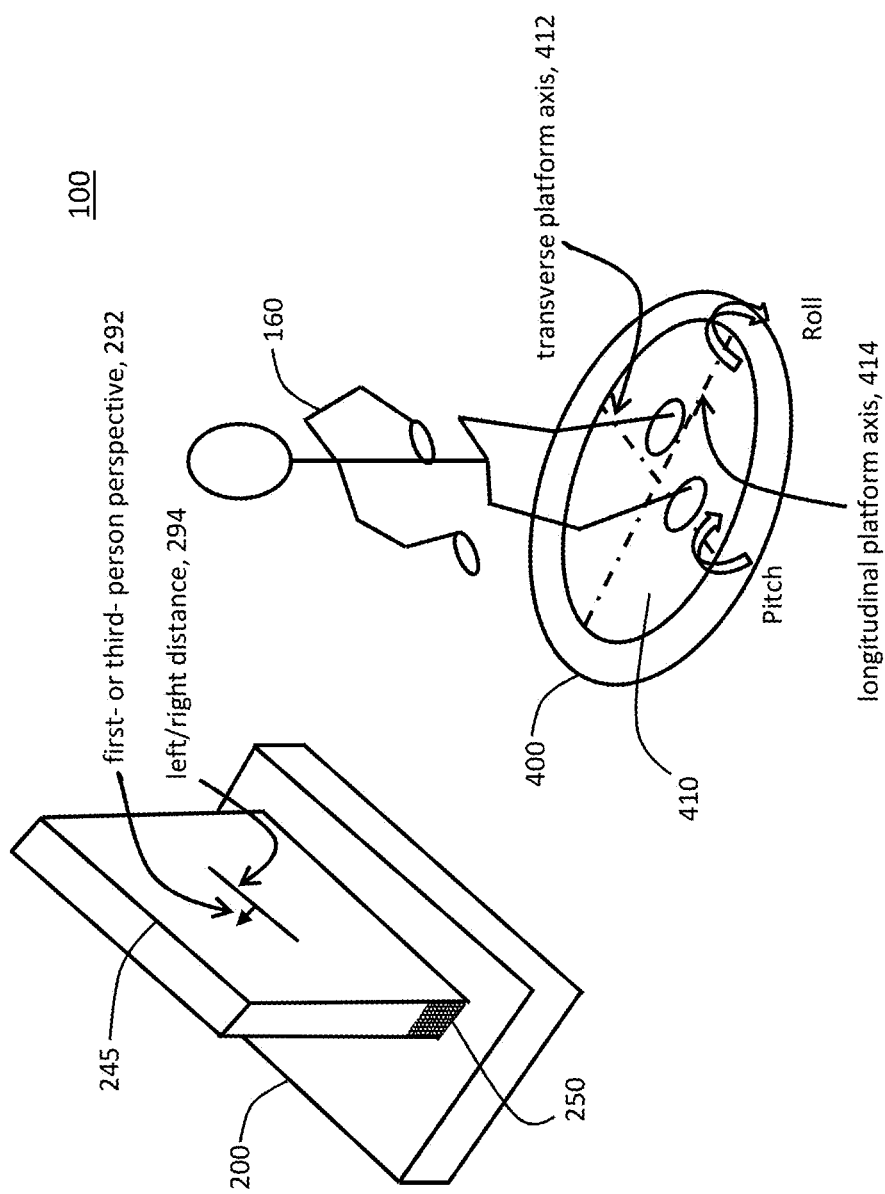
FIG. 1 is a schematic diagram illustrating a game system 100 including a game machine 200 that executes a stored game program, receives two tilt inputs from a game controller 400, and provides control signals to the game controller 400 in an embodiment of the invention.

The various embodiments of the invention and their various features and details are explained more fully with reference to the non-limiting examples that are illustrated in the accompanying drawings and detailed in the following description. It should be noted that the features and details illustrated in the drawings are not necessarily drawn to scale. Descriptions of well-known materials, components, and processing techniques are omitted so as to not unnecessarily obscure the exemplary systems and methods of the embodiments of the invention. The examples described, below, are intended to facilitate an understanding of ways in which the exemplary systems and methods of the embodiments of the invention may be practiced and to further enable those of skill in the art to practice these exemplary systems and methods. Accordingly, the examples should not be construed as limiting the scope of the exemplary systems and methods of the embodiments of the invention.

FIG. 1 is a schematic diagram illustrating a game system 100 including a game machine 200 and a game controller 400 in an embodiment of the invention. During game play, a game player 160 balances on a rigid balance platform 410 of the game controller 400. Postural sway by the game player 160 causes the location of the center of pressure (CoP) on the balance platform 410 to change, and thus, tilt the balance platform 410 about its center point in any direction of the horizontal plane. Tilt is measured by rotation about the transverse x-axis 412 of the balance platform 410, i.e., pitch, and/or about the longitudinal y-axis 414 of the balance platform 410, i.e., roll. A real time dual-axis accelerometer measures the tilt of the balance platform 410 and the real time tilt data are transmitted from the game controller 400 to the game machine 200 in response to requests from a subroutine of a game program executed by the game machine 200. Another subroutine of the game program may calculate the direction and resulting location of the game player's movements in a game space or topology, generated by the game program, based on the real time tilt measures of the balance platform 410. The game program may display the real time changes to a game player's location in the game space on a screen 245 of the game machine 200 using either a forward-facing first- or a third-person perspective 292, where the third-person perspective has a viewpoint removed at a distance from a graphic image of the game player's avatar. The game machine 200 also receives real time sensor data from the game controller 400 relating to the stability of the balance platform 410, i.e., the relative ease with which a game player may tilt the balance platform 410. The game machine 200 outputs control signals governing the stability of the balance platform 410 to the game controller 400, in response to the game program identifying an interaction between the game player, who is located within the game space and an interactive graphic image generated by the game program within the same game space. The game machine 200 also outputs audio data to speakers 250 of the game machine 200. Typically, the game machine 200 and the game controller 400 are powered by mains electricity.

Wireless transfer of data between the game machine 200 and the game controller 400 may utilize transceivers operating under a Bluetooth standard, a wireless LAN protocol, or an infrared communication standard. Alternatively, the game machine 200 and the game controller 400 may communicate via wires. Although not shown, the game machine 200 may also receive direction and location data relating to the movements of other game players from a plurality of other game systems.

Figure 2:
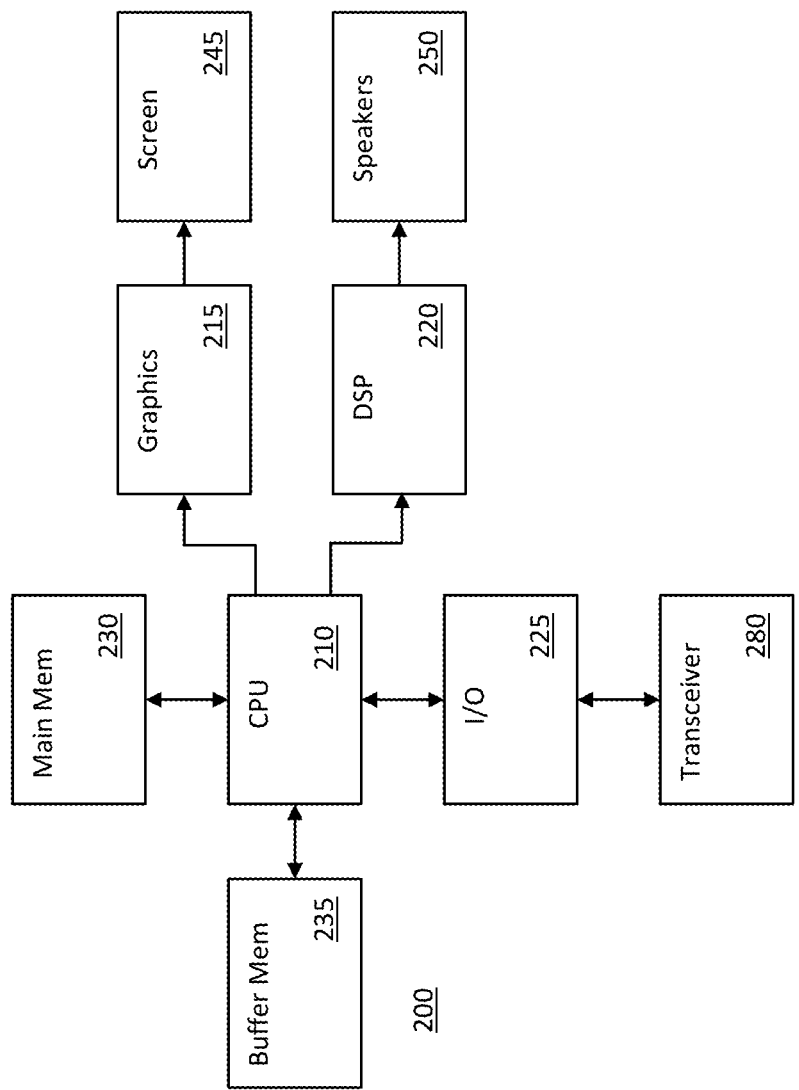
FIG. 2 is a block diagram illustrating hardware components of the game machine 200 in the game system 100 in an embodiment of the invention.

FIG. 2 is a block diagram illustrating hardware components of the game machine 200 of the game system 100 in an embodiment of the invention. A central processor 210 executes a game program and subroutines of the game program that are stored in main memory 230. A game processing subroutine issues graphics generation commands to a graphics processor 215, which creates and displays on the screen 245 of the game machine 200, the game space or topology through which the game player moves in real time may be rendered in a first- or third person perspective. The game space also contains stationary and/or moving interactive graphic images generated by the game program and the graphics processor 215. The interactive graphic images may include any of: geographic features, environmental elements, artifacts, inhabitants, and other game players. A game processing subroutine also issues audio signal generation commands to a digital signals processor 220 to create audio data for output to speakers 250 of the game machine 200.

During game play, the real time location of the game player moves in a sequence of consecutive moves based on the real time measures of the tilt data. An input tilt data subroutine of the game program, executed by the game machine 200, may request tilt data from the game controller 400 at a frequency of 10-100 Hz, and preferably at a frequency of 50 Hz. The tilt data is then stored in the buffer memory 235. Using the real time tilt data, a game player's direction and location subroutine may calculate the direction of each consecutive move to its resulting location. The calculated direction and the resulting location of each game player's move are then stored as game player's direction and location data in the buffer memory 235. A moving interactive graphic image, however, travels through the displayed game space by a sequence of consecutive moves provided by a game processing subroutine of the game program executed by the game machine 200. The direction and the next location of each moving interactive graphic image's move are then stored as interaction's direction and location data in the buffer memory 235. Similarly, each of the stationary interactive graphic images is provided with direction data and location data by the game processing subroutine of the game program, where the direction data provides a direction in which the stationary interactive image faces, for example, a steep cliff of a mountain that faces north, while a gradual incline to the summit of the mountain faces south, and where the location data image maps the extent of the stationary interactive graphic image to the game space. The direction and location data for each of the stationary interactive graphic images is stored in the buffer memory 235.

Real time consecutive air pressure measures, relating to the stability of the balance platform, are transmitted from the game controller 400 to the game machine 200 according to an input air pressure data subroutine of the game program. The input air pressure data subroutine may request air pressure data from the game controller 400 at a frequency of 3-30 Hz, and preferably at a frequency of 20 Hz. Each consecutive real time air pressure measure is stored as air pressure data in the buffer memory 235 of the game machine 200.

An interaction between the game player and an interactive graphic image is generated by the game program of the game machine 200, when the game player moves to a location in proximity to the location of the interactive graphic image in the displayed game space. When the interaction is generated, an interaction's change air pressure subroutine, particular to the interactive graphic image, calculates either a positive or negative change to be made to the air pressure that inflates an inflatable bladder which provides stability to the balance platform 410 of the game controller 400. The calculated change to the air pressure is compared to subsequent real time air pressure measures by a compare air pressure to changed air pressure subroutine of the game program, which then transmits control signals the game controller 400 so as to effect the calculated change to the air pressure. The game program subroutines of the game machine 200 receive real time tilt data and air pressure data from the game controller 400 and transmit control signals from the game machine 200 to the game controller 400 via an input/output processor 225 and a transceiver 280.

The game machine 200 may import a game program via the Internet or may read the game program contained on a compact disk. The game machine 200 stores the game program in the main memory 230. Typically, the game machine 200 is powered by mains electricity.

Figure 3:
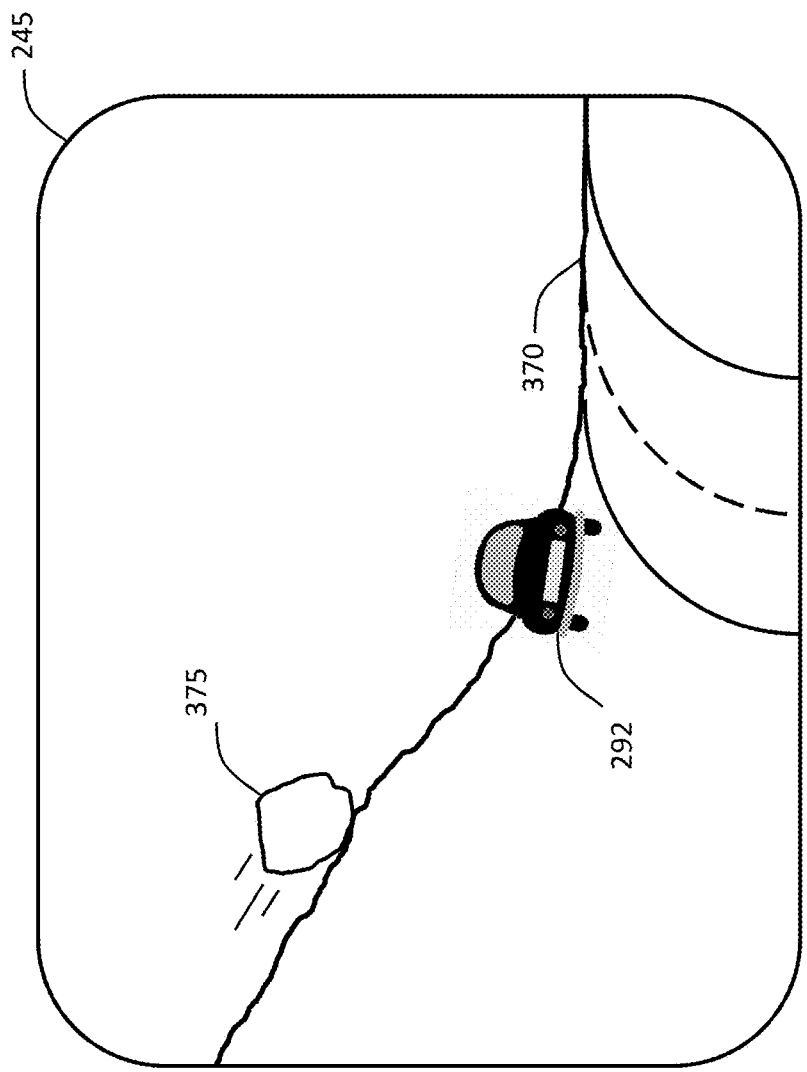
FIG. 3 is an exemplary illustration of a third-person's perspective of the game player's avatar in a game space displayed on a screen of the game machine 200 of the game system 100 in an embodiment of the invention.

FIG. 3 provides an exemplary illustration of a third-person perspective 292 of the game player's avatar, i.e., a car, in a game space displayed on the screen 245 of the game machine 200 of game system 100. The screen 245 also displays a stationary interactive graphic image 370 of an artifact, i.e., a paved road to the game player's right, and a moving interactive graphic image 375 of an environmental element, i.e., a giant boulder rolling downhill, to the game player's left. Moving to the right, so as to drive on the paved road, may cause the stability of the balance platform 410 to increase. Being hit by the boulder, however, may cause inter alia the stability of the balance platform 410 to decrease, reflecting damage to the game player's car.

Figure 4B:
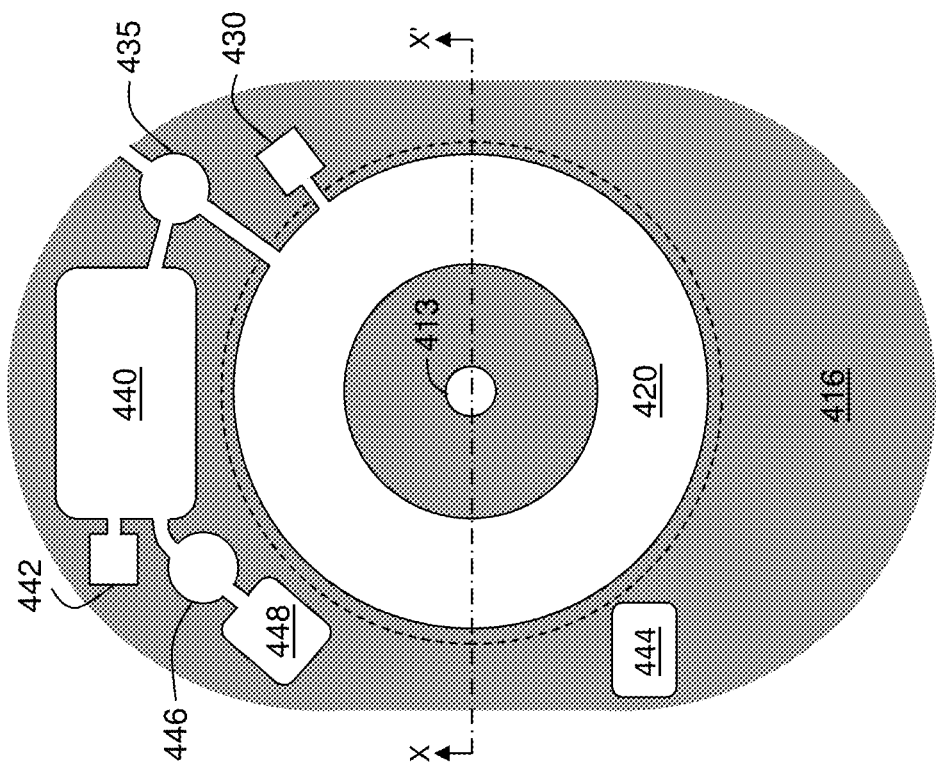
FIG. 4B is a schematic diagram illustrating a top view of the game controller 400, having removed the balance platform, of the game system 100 in an embodiment of the invention.
Figure 4A:
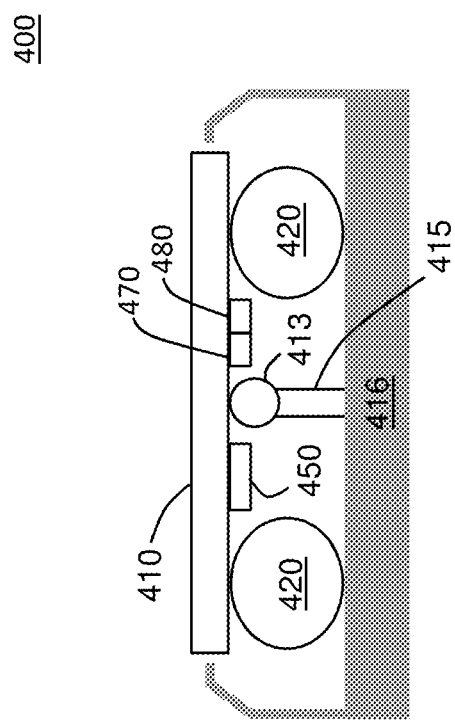
FIG. 4A is a schematic diagram illustrating a cross-section of the game controller 400 of the game system 100 in an embodiment of the invention.

FIG. 4A and FIG. 4B schematically illustrate the hardware components of the game controller 400 of the game system 100 in an embodiment of the invention. FIG. 4A illustrates a cross section of the game controller 400 through the X-X' axis, shown in FIG. 4B, while FIG. 4B illustrates a top view of the game controller 400, where the balance platform 410 has been removed so as to not obscure the underlying components.

In FIG. 4A, the game controller 400 includes a balance platform 410 that responds to the postural sway of a game player standing on the balance platform 410 by tilting about the balance platform's center in any direction of the horizontal plane. The balance platform 410 is supported by a ball joint 413 disposed on a vertical support 415 under the center of the balance platform 410. The vertical support 415 and an inflatable bladder 420 are disposed on a base 416. The inflatable bladder 420 encircles the vertical support 415 and supports the periphery of the balance platform 410.

A dual-axis accelerometer 450, disposed on the underside of the balance platform 410, detects the degrees of tilt about the balance platform's transverse x-axis 412, i.e., pitch, and the balance platform's longitudinal y-axis 414, i.e., roll, relative to the center of the balance platform 410. A maximal degree of tilt about the balance platform's x-axis and/or y-axis may be +/−15° to +/−30°, and preferably +/−20°. An analog-to-digital converter 470 converts, in real time, the degree of tilt about the balance platform's transverse x-axis and the degree of tilt about the balance platform's longitudinal y-axis into digital signals for transmission to the game machine 200 via transceiver 480. Transmission of the tilt data may be conducted according to a Bluetooth standard, a wireless LAN protocol, or an infrared communication standard used by the game machine 200 of game system 100. Alternatively, transmission of the tilt data from the dual-axis accelerometer 450 to the game machine 200 of game system 100 may be over wires.

Referring to FIG. 4B, an air pressure sensor 430 measures, in real time, the air pressure of the inflatable bladder 420, which may be toroidal in shape. The air pressure measures of the inflatable bladder 420 are transmitted to the game machine 200 by transceiver 480 of the game controller 400, according to an input air pressure data subroutine of the game machine 200 of the game system 100. During game play, increasing or decreasing the air pressure of the inflatable bladder 420 causes, respectively, an increased or decreased stability of the balance platform 410. To change the air pressure of the inflatable bladder 420, the game program transmits control signals to the control valve 435 in the game controller 400. The control valve 435 controllably connects an air pressure source including one of: a high-pressure reservoir 440 and an air compressor (not shown) and the inflatable bladder 420, and the inflatable bladder 420 and the atmosphere. When the game program of the game system 100 transmits a positive change to the air pressure of the inflatable bladder 420, a set of control signals opens the control valve 435 between the air pressure source and the inflatable bladder 420, inflating the inflatable bladder 420 and increasing stability of the balance platform 410, and closes the control valve 435 between the air pressure source and the inflatable bladder 420 when the positive change to the air pressure is effected, as measured by the air pressure sensor 430. Alternatively, another set of control signals opens the control valve 435 between the inflatable bladder 420 and the atmosphere, deflating the inflatable bladder 420 and decreasing stability of the balance platform 410, when the game program of the game system 100 transmits a negative change to the air pressure of the inflatable bladder 420, and closes the control valve 435 between the inflatable bladder 420 and the atmosphere when the negative change to the air pressure of the inflatable bladder 420 is effected, as measured by the air pressure sensor 430.

As illustrated in FIG. 4B, the air pressure source may include a high-pressure reservoir 440 to quickly inflate the inflatable bladder 420, so as to quickly increase the stability of the balance platform 410 during game play. The high-pressure reservoir 440 maintains a range of high air pressures that exceed the maximum inflationary air pressure of the inflatable bladder 420. For example, when the maximum inflationary air pressure of the inflatable bladder 420 is 15 psi, the high-pressure reservoir may maintain a range of high air pressures between a lower value of 30 psi and a higher value of 50 psi, so as to quickly inflate the inflatable bladder 420 to a value of 15 psi, when instructed by the game program of the game machine 200 in the game system 100.

A high-pressure sensor 442, connected to the high-pressure reservoir 440, transmits an air pressure value of the high-pressure reservoir 440 to a local processor 444 of the game controller 400 of game system 100. The local processor 444 may request inputs from the high pressure-sensor 442 at a frequency of from 3-30 Hz, and preferably at 20 Hz. The local processor 444 automatically transmits a control signal to activate an air pump 448 and to open an input valve 446, which is connected between the air pump 448 and the high-pressure reservoir 440, when the measured pressure of the high-pressure reservoir 440 is less than the lower value of the range of high air pressures maintained by the high-pressure reservoir 440, e.g., 30 psi, allowing air to be pumped into the high-pressure reservoir 440. The air pump 448 continues to pump air into the high-pressure reservoir 440 until the higher value of the range of high air pressures maintained by the high-pressure reservoir 440, e.g., 50 psi, is reached, at which point, the local processor 444 transmits another control signal to shut off the air pump 448 and to close the input valve 446.

Figure 4C:
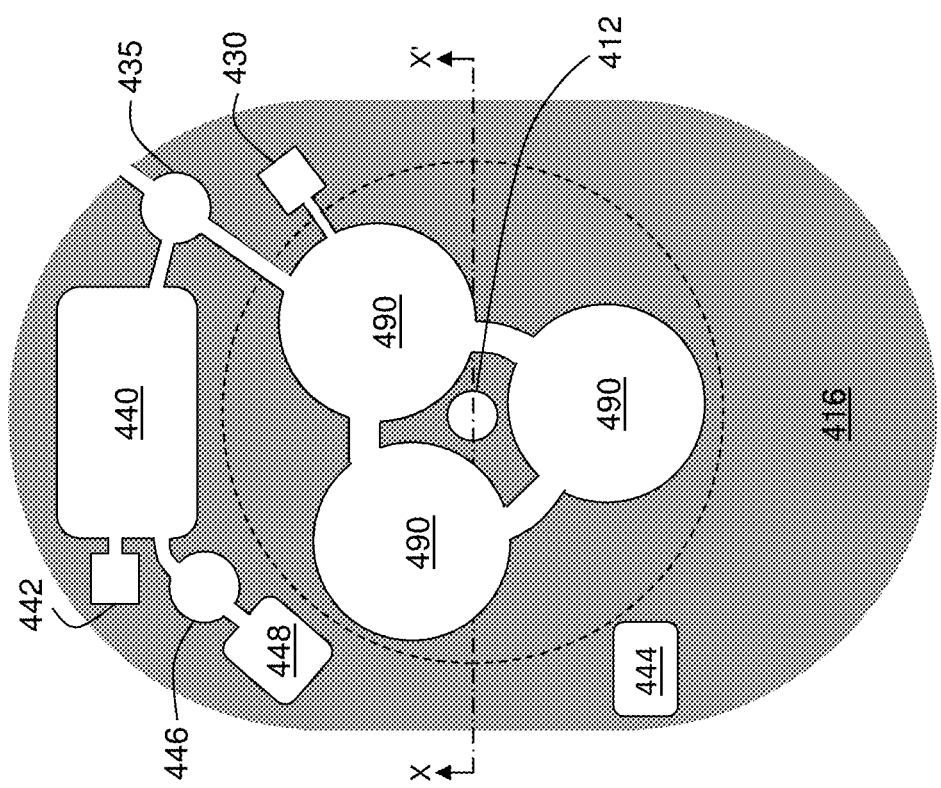
FIG. 4C is a schematic diagram illustrating a top view of the game controller 400, having removed the balance platform, of the game system 100 that reveals an alternative structure for the inflatable bladder in an embodiment of the invention.

As illustrated in the top view of FIG. 4C, the inflatable bladder may include at least three connected bladders 490 to which the control valve 435 and the air pressure sensor 430 are connected in the game controller 400 of game system 100. The reduced volume of the three connected bladders 490, when compared to that of the toroidally-shaped inflatable bladder 420 of FIG. 4B, may allow even more rapid inflation, and thus, even more rapid increases to the stability of the balance platform 410.

Alternatively, the air pressure source of the game controller 400 of the game system 100 may consist of an air compressor (not shown) that is activated by the game program when a positive change to the air pressure of the inflatable bladder 420 is required.

Many video games render a 3-dimensional (3D) graphical perspective of a game space or background from either a first-person perspective or a third-person perspective that displays the game player's avatar. Although the video game may render a 3D perspective, the game controller 400 of the game system 100 inputs but two variables resulting from the game player's postural sway, i.e., the degree of rotation about the balance platform's transverse x-axis 412, i.e., pitch, and the degree of rotation about the balance platform's longitudinal y-axis 414, i.e., roll. The degree of rotation about the balance platform's x-axis caused by the game player's forward and back movements corresponds to a speed of the game player in a forward-facing direction through the 3D graphical perspective of the game space, while the degree of rotation about the balance platform's y-axis caused by the game player's left and right movements corresponds to a lateral distance to be moved by the game player away from the forward-facing direction in the 3D graphical perspective of the game space.

During game play, an input tilt data subroutine of the game program may request consecutive inputs of tilt data from the game controller 400 of the game system 100 at a fixed timing frequency. When the game controller 400 receives a request for tilt data from the game machine 200, the measures of the balance platform's tilt are transmitted from the dual-axis accelerometer 450 to the transceiver 480 of the game controller 400 for transmission to the game machine 200. Alternatively, the tilt data may be sent to the game machine 200 of game system 100 over wires. Upon receipt of the tilt data, the game machine 200 may store the tilt data in the buffer memory 235.

At the start of the game program, the game player stands on the balance platform 410 facing the screen 245 of the game machine 200 of the game system 100. The initial forward-facing direction of the game player, as displayed on the screen 245, further extends a line of sight between the game player standing on his or her balance platform 410 and the screen 245. The game program may assign the forward-facing direction to the initial direction of the game player's movement, and coordinates $(x_0, y_0)$ to the initial location of the game player. An input tilt data subroutine of the game machine 200 may then request an input of tilt data from the game controller 400 according to the fixed timing frequency of the subroutine. The degree of tilt about the transverse x-axis of the balance platform 410 corresponds to a speed of the game player in the forward-facing direction of the game space. Using the fixed time interval of the fixed timing frequency, a game player's direction and location subroutine rapidly calculates from the speed, a distance to be moved in the forward-facing direction by the game player. The degree of tilt about the longitudinal y-axis of the balance platform 410 provides a distance to be moved laterally by the game player, either leftward or rightward, from the forward-facing direction in the fixed timing interval. The distance in the forward-facing direction to be moved and the lateral distance to be moved from the initial coordinates provide new coordinates, $(x_1, y_1)$, in the game space, to which the game player moves in the fixed time interval. The new coordinates, $(x_1, y_1)$, may be stored as game player's direction and location data in the buffer memory 235. With each consecutive movement, in real time, further coordinates, and thus, locations are calculated and stored in the buffer memory 235.

The direction of movement of the game player corresponds to a vector from the initial coordinates, $(x_0, y_0)$, to the new coordinates, $(x_1, y_1)$ of the game space, which may also be calculated by the game player's direction and location subroutine. The direction of movement may be used to turn the game player after each consecutive movement, so that the forward-facing direction of the game player is that of the most recently calculated direction of movement through the game space. For example, a series of consecutive movements by the game player in a leftward direction may result in the game player turning completely about, so as to reverse his or her forward-facing direction to that of a rightward movement.

The locations of stationary interactive graphic images, e.g., the geographic feature of a river-containing canyon in an adventure game, or the artifact of a well-paved road in a racing simulation game, are provided by the game program and are stored in the interaction's direction and location data of the buffer memory 235. The real time locations of moving interactive graphic images, e.g., a wooly mammoth inhabitant of the adventure game, or the environmental element of a moving thunderstorm in the racing simulation, are also stored in real time as interaction's direction and location data in the buffer memory 235.

During game play with the game system 100, a game processing subroutine may compare, in real time, the most recent location of the game player, which is stored as game player's direction and location data in the buffer memory 235, to the locations of stationary interactive graphic images, which are stored as interaction's direction and locations data in the buffer memory 235, and to the most recent locations of moving interactive graphic images, which are also stored as interaction's direction and location data in the buffer memory 235. When the central processor 210 determines the most recent location of the game player matches, or is proximate to, the location of a stationary interactive graphic image or to the most recent calculated location of a moving interactive graphic image, an interaction's change pressure subroutine, particular to the stationary or moving interactive graphic image, is accessed to calculate a change to the air pressure of the inflatable bladder 420, and thus, to effect a change to the stability of the balance platform 410 on which the game player stands.

The calculated change to the air pressure is compared to the subsequent real time air pressure measures by a compare air pressure to changed air pressure subroutine of the game program, which transmits control signals to the control valve 435 of the game controller 400 of the game system 100, so as to change the stability of the balance platform 410. For example, if the most recent location of the game player were to share its location with the stationary location of an interactive graphic image of a smoothly paved road, i.e., an artifact, in a racing simulation game, the interaction's change pressure subroutine may cause the air pressure of the inflatable bladder 420 to change positively, e.g., by +3 psi, and thus, increase the stability of the balance platform 410. On the other hand, if the most recent location of the game player were to share its location with the most recent location of the moving interactive graphic image of a moving thunderstorm, i.e., an environmental element, in the racing simulation game, the interaction's change pressure subroutine may cause the air pressure of the inflatable bladder 420 to change negatively, e.g., by −3 psi, and thus, decrease the stability of the balance platform 410.

FIG. 5A and FIG. 5B are schematic diagrams of an upper surface and a side view, respectively, of a remote game controller 500, which may be a device for the game system 100. A plastic housing 510 of the remote game controller 500 may form a parallelepiped that is easily held in hand of the game player.

An on-off switch 520, e.g., a push button, on the upper surface of the plastic housing 510 may provide battery power to transmit the game player's inputs from the remote game controller 500 to the game machine 200 of the game system 100. Prior to game play, a game selection subroutine stored in the main memory 230 may display a list of game programs on the screen 245 of the game machine 200. The game player may select a particular game from the list of games by using a multi-position switch 530, e.g., numeric thumbwheel switch, on the upper surface of the plastic housing 510 of the remote game controller 500 to select a game, while activating switch 532, e.g., a push button, may cause the identity of the selected game to be transmitted from the remote game controller 500 to the game machine 200 of the game system 100. Also prior to game play, the game player may select an initial stability level for the balance platform 410 of the game controller 400 of the game system 100 by selecting a stability level associated with a position on a multi-position switch 540, e.g., a three-position rotary switch, on the upper surface of the plastic housing 510. The selected stability level of the game system 100 corresponds to a higher, normal or lesser inflationary air pressure value for the balance platform 410. The selected stability value may be transmitted from the remote game controller 500 to the game machine 200 of the game system 100, when switch 542, e.g., a push button, is activated, to effect selection of the initial stability of the balance platform 410.

Activation of a momentary two-position switch 550, e.g., a momentary two-position rocker-switch, on the upper surface of the plastic housing 510 by the game player may provide either an increased or decreased transient speed change to the game machine 200 of the game system 100. The change of speed by the remote game controller 500 may be transmitted to a game processing subroutine of the game program of the game machine 200, which proportionately changes the degree of tilt used by the game player's direction and location subroutine of the game program to yield a proportionately changed speed in the forward-facing direction of the game player. For example, the remote game controller's transient increase in speed may provide a "turbo boost" to a race car in a racing simulation game, while the remote game controller's transient decrease in speed may provide emergency braking to a runaway train in an adventure game.

Similarly, activation of momentary two-position switch 560, e.g., another two-position rocker-switch, on the upper surface of the plastic housing 510 by the game player may transmit either an increased or decreased transient change of air pressure to the game machine 200 of the game system 100. The change of air pressure by the remote game controller 500 may be transmitted to a game processing subroutine of the game program, which then proportionately changes the value of the air pressure data, which is then compared to the subsequent real time air pressure measures by a compare air pressure to changed air pressure subroutine of the game program. The game machine 200 would then transmits control signals to the control valve 435 of the game controller 400 of the game system 100, so as to transiently change the air pressure of the inflatable bladder 420. The control valve 435 may then open between the air pressure source and the inflatable bladder 420 for a period of time, inflating the inflatable bladder 420 and increasing stability of the balance platform 410, or open between the inflatable bladder 420 and the atmosphere for a period of time, deflating the inflatable bladder 420 and decreasing stability of the balance platform 410. For example, activation of momentary two-position switch 560 of the remote game controller 500 of the game system 100 to transiently increase the balance platform's stability may reflect deployment of an inertial damper during a bouncy ride of a racing simulation, while activation of momentary two-position switch 560 to transiently decrease the balance platform's stability may allow quick, sharp turns for a series of switchbacks in the racing simulation.

A trigger 580 may be disposed on a lower surface of the plastic housing 510 of the remote game controller 500 of the game system 100. Activation of the trigger 580 may invoke a subroutine of the game processing program that allows the game player to initiate "shooting" along the forward-facing direction of movement by the game player. In this case, the subroutine may also access an interactive graphic image's location data of any of stationary artifacts, moving inhabitants, or other moving game players stored in the buffer memory 260 of the game machine 200 of the game system 100.

A transceiver 590 may be disposed within the housing 510 of the remote game controller 500 of the game system 100. The transceiver 590 may transmit information from any of: on/off switch 520, multi-position switch 530, switch 532, multi-position switch 540, switch 542, momentary two-position switch 550, momentary two-position switch 560, and trigger 580 to the game machine 200 of the game system 100.

Figure 6:
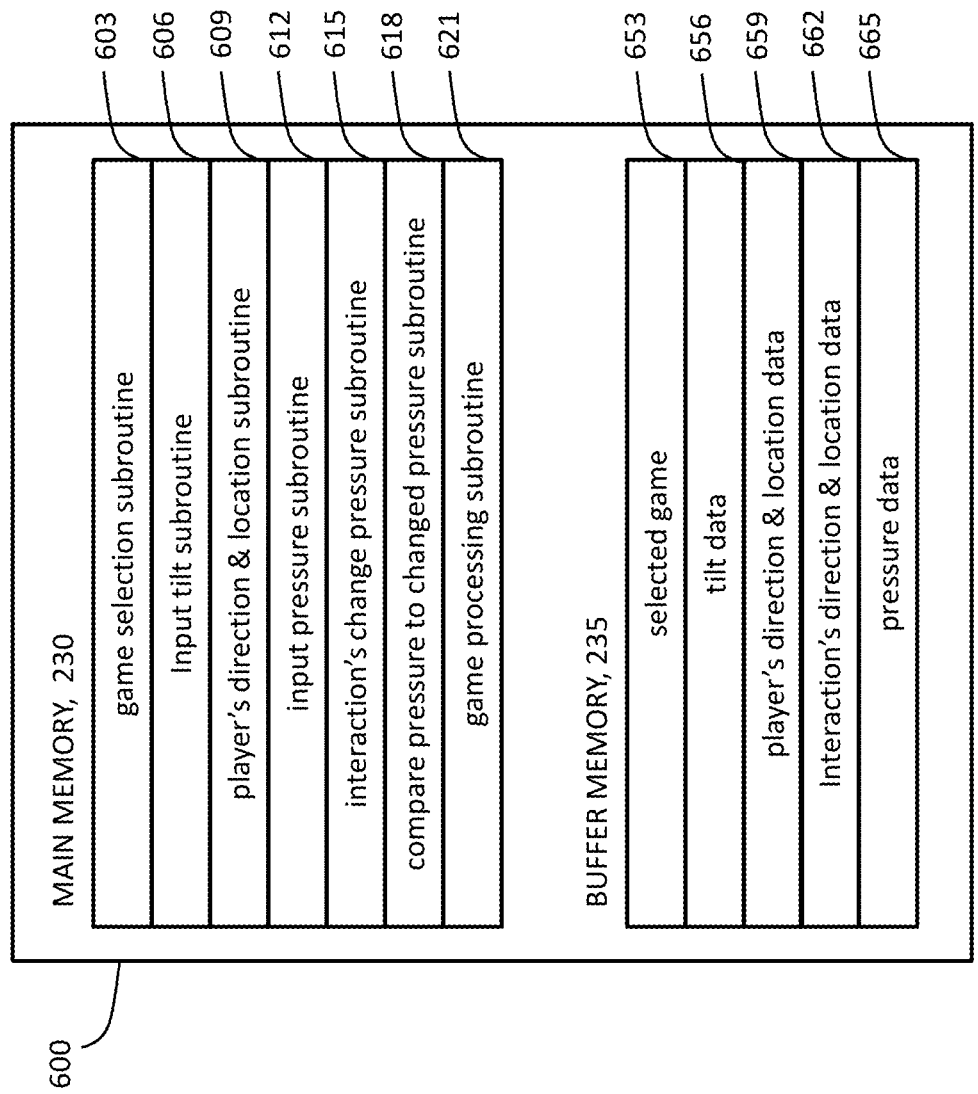
FIG. 6 is a block diagram illustrating a memory map 600 of the game machine 200 of the game system 100 in an embodiment of the invention.

FIG. 6 is a block diagram of a memory map 600 of the game machine 200 of the game system 100 in an embodiment of the invention. The memory map 600 includes a subroutine memory area 603-621 located in the main memory 230 of the game machine 200 and a data memory area 653-665 located in the buffer memory 235 of the game machine 200 of the game system 100. The game machine 200 may load the game program including subroutines 603-621 from the Internet or a compact disk into main memory 230. Additional subroutines, e.g., sound processing subroutines, that are related to the game program, but are not described in this disclosure, are also loaded into the main memory 230.

As described above, the game player may select a game for play using the remote game controller 500 of the game system 100. The game selection subroutine 603, stored in main memory 230 of the game machine 200 of the game system 100, may display a list of the games available to the game player on the screen 245 of the game machine 200. The game player may select a particular game to play, using the remote game controller 500, and the information identifying the selected game is transmitted from the remote game controller 500 to the game machine 200, where the selected game information 653 is stored in buffer memory 235.

An input tilt subroutine 606, stored in main memory 230 of the game machine 200 of the game system 100, may request inputs of real time tilt measures from the game controller 400 at a frequency of 10-100 Hz, and preferably at a frequency of 50 Hz, which is then stored as tilt data 656 in the buffer memory 235 of the game machine 200. The degree of tilt about the transverse x-axis of the balance platform 410 provides a speed of the game player in the forward-facing direction of the game space. Using the fixed time interval of the fixed timing frequency, a game player's direction and location subroutine 609, stored in the main memory 230, calculates from the speed, which is a component of the tilt data 656, a distance to be moved in the forward-facing direction by the game player from his or her current location in the game space. Similarly, the degree of tilt about the longitudinal y-axis of the balance platform 410, which is another component of the tilt data 656, provides to the game player's direction and location subroutine 609, a distance to be moved laterally by the game player, either leftward or rightward, from the current location. The distance to be moved in the forward-facing direction and the distance to be moved laterally provide new coordinates of a new location of the game player at the end of the time interval. The new location and the new forward-facing direction of the game player are stored as player's direction and location data 659 in buffer memory 235 of the game machine 200 of the game system 100.

In the case of a moving interactive graphic image, a game processing subroutine 621, stored in main memory 230 of the game machine 200 of the game system 100, provides real time direction and location data for storage as interaction's direction and location data 662 at the fixed timing frequency. Similarly, in the case of a stationary interactive graphic image, the game processing subroutine 621 provides a direction in which the stationary graphic image faces and its location in the game space, which are also stored as interaction's direction and location data 662 in the buffer memory 235 of the game machine 200 of the game system 100.

An input pressure subroutine 612, stored in the main memory 230 of the game machine 200 of the game system 100, may request real time air pressure measures from the air pressure sensor 430 connected to the inflatable bladder 420 of the game controller 400 at a frequency of 3-30 Hz, and preferably at a frequency of 20 Hz. The real time air pressure measures are stored as pressure data 665 in the buffer memory 235 of the game machine 200 of the game system 100.

During game play, a game processing subroutine 621 may compare, in real time, the most recent location of the game player, which is stored as game player's direction and location data 659 in the buffer memory 235 of the game machine 200 of the game system 100, to the locations of stationary interactive graphic images, which are stored as interaction's direction and locations data 662 in the buffer memory 235, and to the most recent locations of moving interactive graphic images, which are also stored as interaction's direction and location data 662 in the buffer memory 235. When a subroutine of the game program determines the most recent location of the game player matches, or is proximate to, the location of a stationary interactive graphic image or to the most recent calculated location of a moving interactive graphic image, an interaction's change pressure subroutine 615, particular to the stationary or moving interactive graphic image, is accessed to calculate a change to the air pressure of the inflatable bladder 420, and thus, to effect a real time change to the stability of the balance platform 410 on which the game player stands.

The calculated change to the air pressure is compared to the subsequent real time air pressure measures by a compare air pressure to changed air pressure subroutine 618 of the game program of the game machine 200 of the game system 100, which transmits control signals to the control valve 435 of the game controller 400, so as to change the stability of the balance platform 410.

Figure 7:
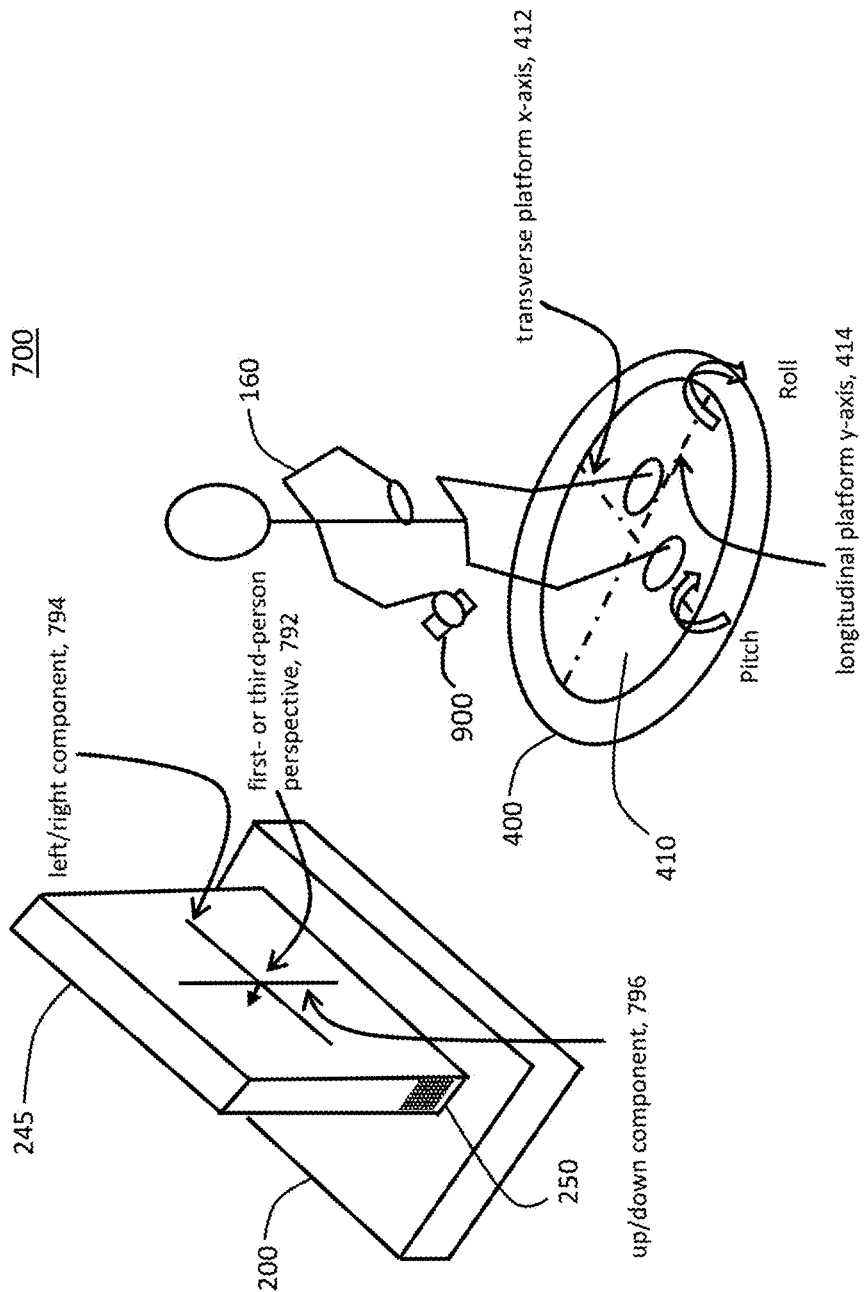
FIG. 7 is a schematic diagram illustrating a game system 700 including a game machine 200 that executes a stored game program, receives two tilt inputs from the game controller 400, receives a third speed input from a remote game controller with speed control 900, and provides control signals to the game controller 400 in an embodiment of the invention.

FIG. 7 is a schematic diagram illustrating a game system 700 including a game machine 200, a game controller 400, and a remote game controller with speed control 900 in another embodiment of the invention. The hardware components of the game machine 200 of game system 100, illustrated in FIG. 2, and the hardware components of the game controller 400 of the game system 100, illustrated in FIGS. 4A-C, are identical to the hardware components of the game machine 200 and the game controller 400 of the game system 700 illustrated in FIG. 7.

In contrast to the game system 100, however, the software programs and subroutines executed by the game machine 200 of the game system 700 convert the game player's real time tilting about the balance platform's transverse x-axis 412, i.e., pitch, and the balance platform's longitudinal y-axis 414, i.e., roll, into two axial variables, an up/down component 796 and a left/right component 794, respectively, that when summed yield a forward-facing direction (not magnitude) of movement for a first- or third-person perspective 792 of the game player to his or her next location in a sequence of consecutive moves. For example, the game player may cause the balance platform 410 to pitch downward about the x-axis by 15°, while simultaneously rolling about the y-axis to the right by 45° to perform a dive to the right. In addition, the game player 160 provides via his or her remote game controller with speed control 900 of the game system 700, a real time third axial variable, i.e., a magnitude of speed along the calculated forward-facing direction from a current location to a next location. The speed of the first- or third-person perspective 792 of the game player along the calculated forward-facing direction moves the game player a distance away from the plane of his or her current location to the next location along a third axis, i.e., a depth "into" the screen 245 for the first- or third-person perspective 792 of the game player. Thus, the 3 input variables input by the game player 160 allow controlled movement through a volume of a 3-dimensional (3D) game space in the game system 700.

Referring to FIG. 7, the game player's tilting about the transverse x-axis 412 and the longitudinal y-axis 414 of the balance platform 410 may be likened to a joystick control of a flight simulation game, which allows the game player to bank (tilt sideways), climb and dive, while the game player's input via the remote game controller with speed control 900 may be likened to a separate throttle control, i.e., speed control, of the flight simulation game.

Unlike the flight simulation game using a joystick control, the physical movements of the game player 160 on the balance platform 410 of game system 700 mirror the movements of the first- or third-person perspective 792 of the game player through the volume of the 3D game space. For example, as the game player 160 leans forward and to the right, the balance platform 410 tilts down and to the right and the first- or third-person perspective 792 of the game player on the screen 245 of game system 700 banks to the right and dives, and as the game player 160 leans back, the balance platform 410 tilts up, and the first- or third-person perspective 792 of the game player climbs into the sky. Thus, the balance platform 410 of the game controller 400 of the game system 700 calls to mind, the Goblin Glider flown by the Green Goblin® or the surfboard flown by the Silver Surfer® of Marvel Comics.

Also, unlike the flight simulation game using a joystick control, movements of the balance platform 410 about the transverse x-axis 412 and the longitudinal y-axis 414 are subject to changes in the stability of the balance platform 410, i.e., the relative ease with which a game player may tilt the balance platform 410, when an interaction between the locations of a game player and an interactive graphic image is generated by the game program.

Referring to FIG. 2 and FIG. 7, the hardware components of the game machine 200 of the game system 100, illustrated in FIG. 2, are identical to those of the game machine 200 of the game system 700 illustrated by FIG. 7. In the game system 700, the game machine 200 includes a central processor 210 that executes a game program and subroutines, which are stored in main memory 230. A game processing subroutine issues graphics generation commands to a graphics processor 215, which creates and displays on the screen 245 of the game machine 200 of the game system 700, the 3D game space through which the first- or third-person perspective 792 of the game player moves in real time. The 3D game space also contains stationary and/or moving interactive graphic images generated by the game program and the graphics processor 215. The interactive graphic images may include any of: geographic features, environmental elements, artifacts, inhabitants, and other game players. A game processing subroutine also issues audio signal generation commands to a digital signals processor 220 to create audio data for output to speakers 250 of the game machine 200.

During game play with the game system 700, the first- or third-person perspective 792 of the game player moves in a sequence of consecutive moves based on real time measures of the input tilt data from the game controller 400 and the input speed data from the remote game controller with speed control 900 of the game system 700. An input tilt data subroutine and an input speed data subroutine of the game program of the game system 700 may request tilt data from the game controller 400 and speed data from the remote game controller with speed control 900 at a frequency of 10-100 Hz, and preferably at a frequency of 50 Hz. The tilt data and the speed data are then stored in the buffer memory 235 of the game machine 200 of the game system 700. Using the real time tilt data and speed data, a game player's direction and location subroutine, executed by the game machine 200 of the game system 700, may calculate the direction of each consecutive move to its resulting location in the next fixed timing interval. The calculated direction and the resulting location of each game player's move are then stored as game player's direction and location data in the buffer memory 235 of the game machine 200 of the game system 700.

A moving interactive graphic image travels through the 3D game space by a sequence of consecutive moves that are displayed on the screen 245 of the game machine 200 of the game system 700, based on direction and location data provided by a game processing subroutine of the game program. The direction and location data for each moving interactive graphic image's move are stored in real time as interaction's direction and location data in the buffer memory 235 of the game machine 200 of the game system 700. Similarly, direction and location data for each stationary interactive graphic image is provided by the game processing subroutine, where the direction information of the stationary interactive graphic image provides a direction in which the stationary interactive image faces and where the location data of the stationary interactive graphic image maps the extent of the stationary interactive graphic image to the 3D game space. The direction and location data for each of the stationary interactive graphic images is also stored in the buffer memory 235 of the game machine 200 of the game system 700.

Referring to FIG. 7, an interaction between the locations of the game player and an interactive graphic image in the game space is generated by the game program of the game machine 200 of the game system 700, when the game player moves to a location proximate to the location of the interactive graphic image 775 in the 3D game space. When the interaction, which is particular to the interactive graphic image, is generated, an interaction's change air pressure subroutine, executed by the game machine 200 of the game system 700, calculates either a positive or negative change to be made to the air pressure that inflates an inflatable bladder, which provides stability to the balance platform 410 of the game controller 400 of the game system 700. The calculated change to the air pressure is compared to subsequent real time air pressure measures by a compare air pressure to changed air pressure subroutine of the game program executed by the game machine 200 of the game system 700. The game machine 200 of the game system 700 then transmits control signals to the game controller 400 of the game system 700, so as to effect the calculated change to the air pressure. The game machine 200 of the game system 700 receives real time tilt data and air pressure data from the game controller 400 and real time speed data from the remote game controller with speed control 900, and transmits control signals from the game machine 200 to the game controller 400 of the game system 700 via an input/output processor 225 and a transceiver 280 of the game machine 200 of the game system 700.

The game machine 200 of the game system 700 may import a game program via the Internet or may read the game program contained on a compact disk. The game machine 200 of the game system 700 stores the game program in its main memory 230. Typically, the game machine 200 of the game system 700 is powered by mains electricity.

Referring to FIGS. 4A-4C and FIG. 7, the hardware components of the game controller 400 of the game system 700 are illustrated in FIGS. 4A-4C. In the game system 700, the game controller 400 includes a balance platform 410 that responds to postural sway of a game player standing on the balance platform 410 by tilting about the balance platform's center in any direction of the horizontal plane. The balance platform 410 is supported by a ball joint 413 disposed on a vertical support 415 under the center of the balance platform 410. In the game system 700, the game controller 400 further includes an inflatable bladder 420 that is disposed on a base 416 and encircles the vertical support 415, while supporting the periphery of the balance platform 410.

In the game system 700, the game controller 400 yet further includes a dual-axis accelerometer 450, disposed on the underside of the balance platform 410, that detects the degrees of tilt about the balance platform's transverse x-axis, i.e., pitch, and the balance platform's orthogonal longitudinal y-axis, i.e., roll. A maximal degree of tilt about the balance platform's x-axis and/or y-axis may be +/−15° to +/−30°, and preferably +/−20°. In the game system 700, the game controller 400 yet further includes an analog-to-digital converter 470 that converts, in real time, the degree of tilt about the balance platform's transverse x-axis and the degree of tilt about the balance platform's longitudinal y-axis into digital signals for transmission to the game machine 200 of the game system 700 via transceiver 480. Transmission of the tilt data may be conducted according to a Bluetooth standard, a wireless LAN protocol, or an infrared communication standard used by the game machine 200 of the game system 700. Alternatively, transmission of the tilt data from the dual-axis accelerometer 450 of the game controller 400 of the game system 700 to the game machine 200 of the game system 700 may be over wires.

In the game system 700, the game controller 400 yet further includes an air pressure sensor 430 that measures, in real time, the air pressure of the inflatable bladder 420, which may be toroidal in shape. The air pressure measures of the inflatable bladder 420 are transmitted to the game machine 200 of the game system 700 by transceiver 480 of the game controller 400, according to an input air pressure data subroutine of the game machine 200. An input air pressure data subroutine may request air pressure data from the game controller 400 of the game system 700 at a frequency of 3-30 Hz, and preferably at a frequency of 20 Hz. Each consecutive real time air pressure measure is stored as air pressure data in the buffer memory 235 of the game machine 200 of the game system 700.

To change the air pressure of the inflatable bladder 420, the game program executed by the game system 700 transmits control signals to the control valve 435 in the game controller 400 of the game system 700. The control valve 435 of the game system 700 controllably connects an air pressure source of the game system 700 including one of: a high-pressure reservoir 440 of the game system 700 and an air compressor (not shown) and the inflatable bladder 420, and the inflatable bladder 420 and the atmosphere. When the game program of the game system 700 transmits a positive change to the air pressure of the inflatable bladder 420, a set of control signals opens the control valve 435 between the air pressure source and the inflatable bladder 420, inflating the inflatable bladder 420 and increasing stability of the balance platform 410, and closes the control valve 435 between the air pressure source and the inflatable bladder 420 when the positive change to the air pressure is effected, as measured by the air pressure sensor 430. Alternatively, another set of control signals opens the control valve 435 between the inflatable bladder 420 and the atmosphere, deflating the inflatable bladder 420 and decreasing stability of the balance platform 410, when the game program of the game system 700 transmits a negative change to the air pressure of the inflatable bladder 420, and closes the control valve 435 between the inflatable bladder 420 and the atmosphere when the negative change to the air pressure of the inflatable bladder 420 is effected, as measured by the air pressure sensor 430.

In the game controller 400 of the game system 700, a high-pressure sensor 442 is connected to the high-pressure reservoir 440 and transmits an air pressure value of the high-pressure reservoir 440 to a local processor 444. In the game system 700, the local processor 444 of the game controller 400 may request inputs from the high pressure-sensor 442 at a frequency of from 3-30 Hz, and preferably at a frequency of 20 Hz. The local processor 444 of the game system 700 automatically transmits a control signal to activate an air pump 448 and to open an input valve 446, which is connected between the air pump 448 and the high-pressure reservoir 440, when the measured pressure of the high-pressure reservoir 440 is less than the lower value of the range of high air pressures maintained by the high-pressure reservoir 440, allowing air to be pumped into the high-pressure reservoir 440. The air pump 448 of the game system 700 continues to pump air into the high-pressure reservoir 440 until the higher value of the range of high air pressures maintained by the high-pressure reservoir 440 is reached, at which point, the local processor 444 transmits another control signal to shut off the air pump 448 and to close the input valve 446.

In the game controller 400 of the game system 700, the inflatable bladder may include at least three connected bladders 490 to which the control valve 435 and the air pressure sensor 430 are connected.

Alternatively, the air pressure source of the game controller 400 of the game system 700 may consist of an air compressor (not shown) that is activated by the game program of the game system 700 when a positive change to the air pressure of the inflatable bladder 420 is required.

During game play with the game system 700, input tilt data and input speed data subroutines of the game program may request consecutive inputs of tilt data from the game controller 400 and speed data from the remote game controller with speed control 900 at a fixed timing frequency. Alternatively, the tilt data and speed data may be sent to the game machine 200 of the game system 700 over wires. Upon receipt of the tilt data and the speed data, the game machine 200 of game system 700 may store the tilt data and speed data in the buffer memory 235.

At the start of the game program in game system 700, the game player stands on the balance platform 410 facing the screen 245 of the game machine 200. The initial forward-facing direction of the first- or third perspective 702 of the game player is perpendicular to the plane of the left/right component 794 and the up/down component 796. The game program of the game system 700 may assign the forward-facing direction to the initial direction of the game player's movement and coordinates ($x_0$, $y_0$, $z_0$) to the initial location of the game player. In the game system 700, the input tilt data and input speed data subroutines of the game machine 200 may then request tilt data from the game controller 400 and speed data from the remote game controller with speed control 900 according to the fixed timing frequency of the subroutine. The tilt about the transverse x-axis of the balance platform 410 and the tilt about the longitudinal y-axis of the balance platform 410 correspond to an up/down component 796 and a left/right component 794, respectively, of a forward-facing direction for the game player moving through a game space of the game program in game system 700. When summed, the up/down and left/right components 796, 794 provide a forward-facing direction (not magnitude) for the game player's movement from his or her current location to a next location in the next timing interval, while the magnitude of the speed control from the remote game controller with speed control 900 provides a speed of movement for the game player along the calculated forward-facing direction. Using the fixed time interval of the fixed timing frequency, the game player's direction and location subroutine of the game system 700 rapidly calculates from the speed, a distance to be moved in the forward-facing direction by the game player; thus, moving the game player through the volume of the 3D game space. The calculation of the forward-facing direction in which the game player is to be moved and the distance along the forward-facing direction by which the game player is moved provides new coordinates ($x_1$, $y_1$, $z_1$) in the 3D game space, to which the game player moves in the fixed timing interval. The new coordinates ($x_1$, $y_1$, $z_1$) may be stored as game player's direction and location data in the buffer memory 235 of the game system 700. With each consecutive movement, in real time, further coordinates, and thus, locations are calculated and stored in the buffer memory 235 of the game system 700.

In the game system 700, the directions and locations of stationary interactive graphic images, e.g., the geographic feature of mountain in an adventure game, or the artifact of an air race pylon in a racing simulation game, are provided by a game processing subroutine and are stored in the interaction's direction and location data of the buffer memory 235 of the game machine 200. Similarly, the real time locations of moving interactive graphic images, e.g., a flying pterosaur of the adventure game, or the environmental element of a moving thunderstorm in the racing simulation, are stored as interaction's direction and location data in the buffer memory 235 of the game machine 200 of the game system 700.

During game play with the game system 700, a game processing subroutine may compare, in real time, the most recent location of the game player, which is stored as game player's direction and location data in the buffer memory 235, to the locations of stationary interactive graphic images, which are stored as interaction's direction and locations data in the buffer memory 235, and to the real time locations of moving interactive graphic images, which are also stored as interaction's direction and location data in the buffer memory 235. When the central processor 210 of the game machine 200 of the game system 700 determines the location of the game player matches, or is proximate to, the location of a stationary interactive graphic image or to the real time location of a moving interactive graphic image, an interaction's change pressure subroutine, particular to the stationary or moving interactive graphic image, is accessed to calculate a change to the air pressure of the inflatable bladder 420, and thus, to effect a change to the stability of the balance platform 410 on which the game player stands.

The calculated change to the air pressure is compared to the subsequent real time air pressure measures by a compare air pressure to changed air pressure subroutine of the game program of the game machine 200 of game system 700, which transmits control signals to the control valve 435 of the game controller 400, so as to change the stability of the balance platform 410. For example, if the real time location of the game player playing the game system 700 were to share its location with the stationary location of an interactive graphic image of a gently rising thermal column of air, i.e., an environmental element in a flight simulation game, the interaction's change pressure subroutine may cause the air pressure of the inflatable bladder 420 to change positively, e.g., by +3 psi, and thus, increase the stability of the balance platform 410. On the other hand, if the real time location of the game player playing the game system 700 were to share its location with the real time location of the moving interactive graphic image of a turbulent thunderstorm, i.e., an environmental element in the flight simulation game, the interaction's change pressure subroutine may cause the air pressure of the inflatable bladder 420 to change negatively, e.g., by −3 psi, and thus, decrease the stability of the balance platform 410.

Figure 8:
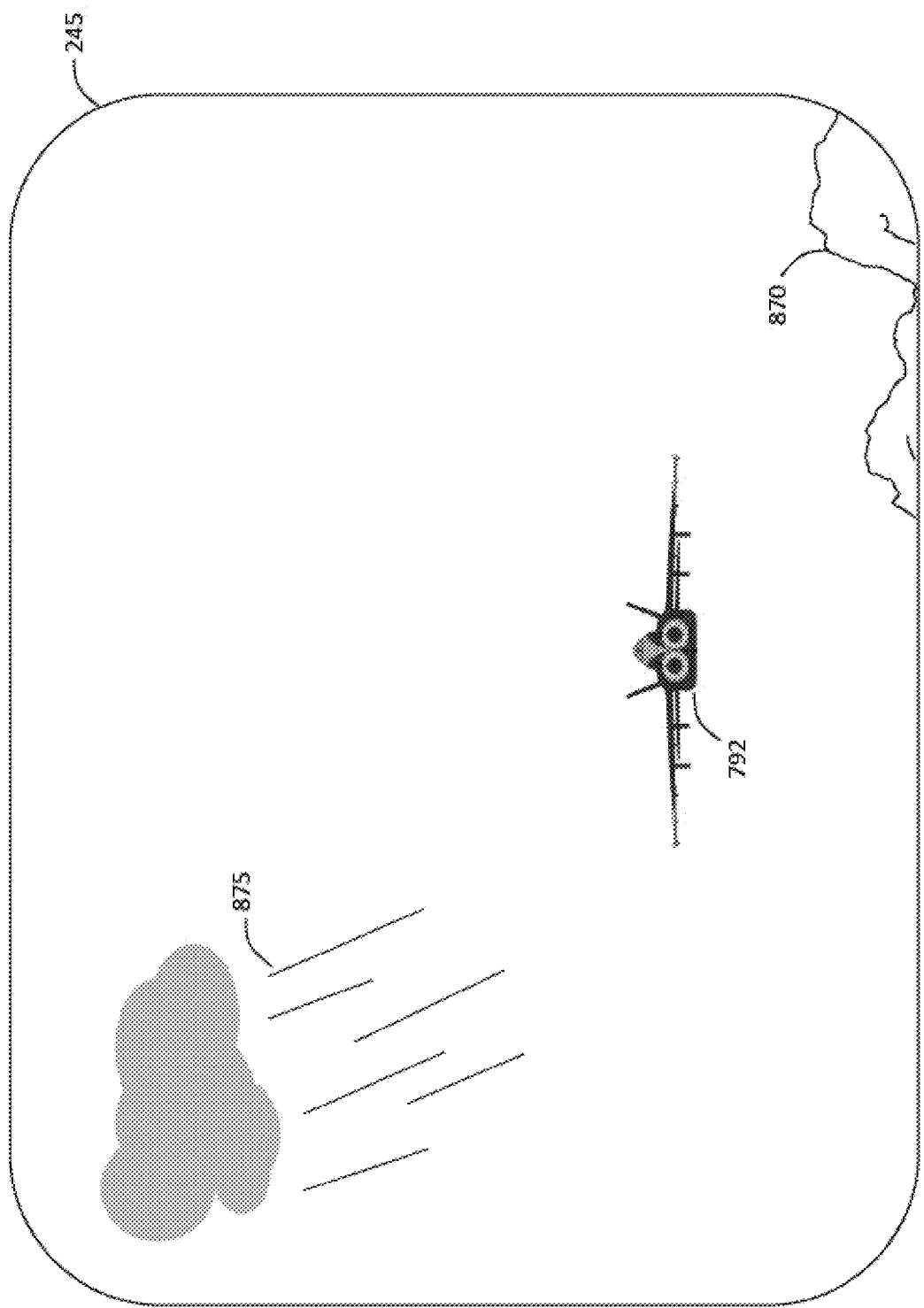
FIG. 8 is an exemplary illustration of a third-person's perspective of the game player's avatar in a 3-dimensional (3D) game space displayed on a screen of the game machine 200 of the game system 700 in an embodiment of the invention.

FIG. 8 provides an exemplary illustration of a third-person perspective 792 of the game player's avatar, i.e., a fighter jet, in a 3D game space displayed on the screen 245 of the game machine 200 of the game system 700. The screen 245 also displays a stationary interactive graphic image 870 of a geographic feature, i.e., a low-lying mountain range, to the game payer's right, and a moving interactive graphic image 875 of an environmental element, i.e., a moving thunderstorm, to the game player's left. During game play, flying over the low-lying mountain range into an enclosed valley with calmer air may cause the stability of the balance platform 410 to increase, while flying into the turbulent winds of the moving thunderstorm may cause the stability of the balance platform 410 to decrease.

FIG. 9A and FIG. 9B are schematic diagrams of an upper surface and a side view, respectively, of a remote game controller with speed control 900, which is a device of the game system 700. A plastic housing 910 of the remote game controller with speed control 900 may form a parallelepiped that is easily held in hand of the game player.

An on-off switch, e.g., a button, 920 on the upper surface of the plastic housing 910 may provide battery power to transmit the game player's inputs from the remote game controller with speed control 900 to the game machine 200 of the game system 700. Prior to game play, a game selection subroutine stored in the main memory 230 may display a list of game programs on the screen 245 of the game machine 200 of the game system 700. The game player may select a particular game from the list of games by using a multi-position switch 930, e.g., a numeric thumbwheel switch, on the upper surface of the plastic housing 910 of the remote game controller with speed control 900 to select a game, while activating switch 932, e.g., a button, may cause the identity of the selected game to be transmitted from the remote game controller with speed control 900 to the game machine 200 of the game system 700. Also prior to game play, the game player may select an initial stability for the balance platform 410 of the game controller 400 of the game system 700 by selecting a stability level associated with a position on a multi-position switch 940, e.g., a three-position rotary switch, on the upper surface of the plastic housing 910. The selected stability level of the game system 700 corresponds to a higher, normal or lesser inflationary air pressure value for the balance platform 410. The selected stability value may be transmitted from the remote game controller 500 to the game machine 200 of the game system 700, when selected stability switch 942 is activated, to effect selection of the initial stability of the balance platform 410.

Activation of switch 950, e.g., a momentary two-position rocker-switch, on the upper surface of the plastic housing 910 by the game player may provide either an increased or decreased transient speed change to the game machine 200 of the game system 700. The change of speed by the remote game controller with speed control 900 may be transmitted to a game processing subroutine of the game program, which proportionately changes the speed data to yield a distance to be moved in the forward-facing direction of the game player in the game system 700. For example, activation of switch 950 to transiently increase speed may provide afterburners for a jet at take-off in a flight simulation game, while activation of switch 950 to transiently decrease speed may provide a drogue parachute to slow a jet at landing in the flight simulation game.

Similarly, activation of switch 960, e.g., another two-position rocker-switch, on the upper surface of the plastic housing 910 by the game player may provide either an increased or decreased transient change of air pressure to the game machine 200 of game system 700. The change of air pressure by the remote game controller with speed control 900 may be transmitted to a game processing subroutine of the game program, which proportionately changes the measure of the air pressure, which is then compared to the subsequent real time air pressure measures by a compare air pressure to changed air pressure subroutine of the game program of game system 700. The game program of the game system 700 then transmits control signals to the control valve 435 of the game controller 400, so as to transiently change the air pressure of the inflatable bladder. In the game system 700, the control valve 435 may then open between the air pressure source and the inflatable bladder 420 for a period of time, inflating the inflatable bladder 420 and increasing stability of the balance platform 410, or open between the inflatable bladder 420 and the atmosphere for a period of time, deflating the inflatable bladder 420 and decreasing stability of the balance platform 410. For example, activation of switch 960 to transiently increase the balance platform's stability may reflect increased power to the flight controls in a flight simulation game, while activation of switch 960 to transiently decrease the balance platform's stability may reflect a loss of power to the flight controls in the flight simulation game.

A game player-controlled variable speed control 970, e.g., a single-turn potentiometer, on the upper surface of the plastic housing 910 of the remote game controller with speed control 900 may provide a variable speed in the forward-facing direction of the game player that is input to the game machine 200 of the game system 700 in real time. Using the fixed time interval of the fixed timing frequency, the game player's direction and location subroutine of the game system 700 rapidly calculates from the input speed, a distance to be moved in the forward-facing direction by the game player; thus, controllably moving the game player through the volume of the 3D game space. Alternatively, the game player may wear a headset that transmits voice commands related to speed changes to the game machine 200 of the game system 700.

A trigger 980 may be disposed on a lower surface of the plastic housing 910. Activation of the trigger 980 may invoke a subroutine of the game processing program of the game system 700 that allows the game player to initiate "shooting" along the direction of movement by the game player. In this case, the subroutine may also access an interactive graphic image's location data of any of stationary artifacts, moving inhabitants, or other moving game players stored in the buffer memory 260 of the game machine 200 of the game system 700.

A transceiver 990 may be disposed within the plastic housing 910 of the remote game controller with speed control 900. The transceiver 990 may transmit information from any of: on/off switch 920, multi-position switch 930, switch 932, multi-position switch 940, switch 942, momentary two-position switch 950, momentary two-position switch 960, and trigger 980 to the game machine 200 of the game system 700.

Figure 10:
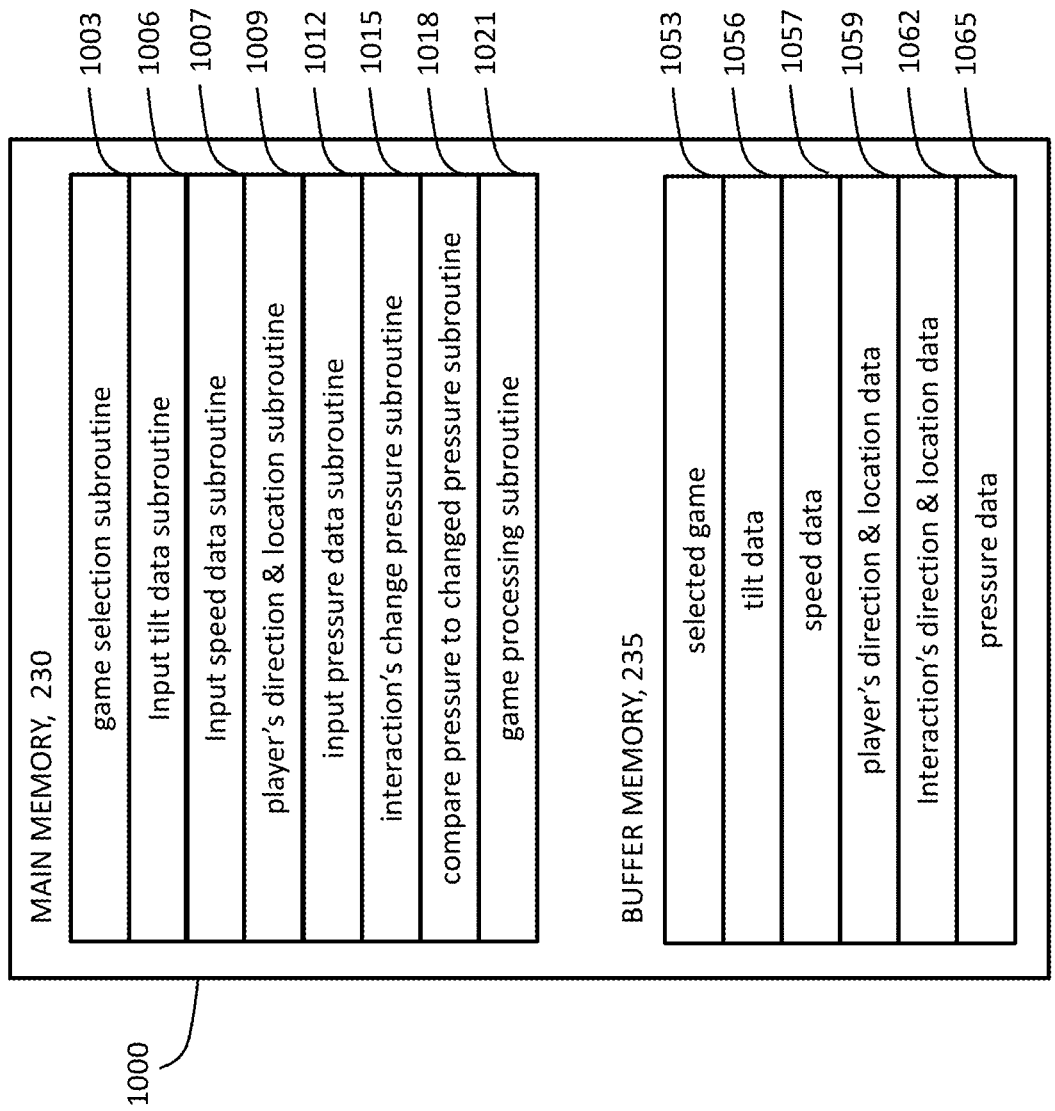
FIG. 10 is a block diagram illustrating a memory map 1000 of the game machine 200 of the game system 700 in an embodiment of the invention.

FIG. 10 is a block diagram of a memory map 1000 of the game machine 200 of the game system 700. The memory map 1000 includes a subroutine memory area 1003-1021 located in the main memory 230 of the game machine 200 of the game system 700 and a data memory area 1053-1065 located in the buffer memory 235 of the game machine 200 of the game system 700. The game machine 200 of the game system 700 may load the game program including subroutines 1003-1021 from the Internet or a compact disk into the main memory 230. Additional subroutines, e.g., sound processing subroutines, that are related to the game program of the game system 700, but are not described in this disclosure, are also loaded into the main memory 230.

As described above, the game player may select a game for play using the remote game controller with speed control 900. The game selection subroutine 1003, stored in main memory 230, may display a list of the games available to the game player on the screen 245 of the game machine 200 of the game system 700. The game player may select a particular game to play, using the remote game controller with speed control 900, and the information identifying the selected game is transmitted from the remote game controller with speed control 900 to the game machine 200 of the game system 700, where the selected game information 1053 is stored in buffer memory 235.

An input tilt data subroutine 1006 and an input speed data subroutine 1007 of the game program of the game system 700 request tilt data from the game controller 400 and speed data from the remote game controller with speed control 900 at a frequency of 10-100 Hz, and preferably at a frequency of 50 Hz. The tilt data 1056 and the speed data 1057 are then stored in the buffer memory 235 of the game machine 200 of the game system 700. Using the real time tilt data 1056 and speed data 1057, a game player's direction and location subroutine 1009, executed by the game machine 200 of the game system 700, may calculate the direction of each consecutive move to its resulting location for the next fixed timing interval. The calculated direction and the resulting location of each game player's move are then stored as game player's direction and location data 1059 in the buffer memory 235 of the game machine 200 of the game system 700.

A moving interactive graphic image moves through the 3D game space by a sequence of consecutive moves at the fixed frequency that are displayed on the screen 245 of the game machine 200 of the game system 700, based on direction and location data provided by a game processing subroutine 1021, which are then stored in interaction's direction and location data 1062 of the buffer memory 235. Similarly, direction and location data for each stationary interactive graphic image is stored as interaction's direction and location data 1062 in the buffer memory 235 of the game machine 200 of the game system 700, where the direction information of the stationary interactive graphic image provides a direction in which the stationary interactive image faces and where the location data of the stationary interactive graphic image maps the extent of the stationary interactive graphic image to the 3D game space.

An interaction between the game player and an interactive graphic image, particular to the interactive graphic image, is generated by a game processing subroutine 1021 of the game program of the game machine 200 of the game system 700, when the game player moves to a location in proximity to the location of the interactive graphic image in the 3D game space. When the interaction is generated, an interaction's change air pressure subroutine 1015, executed by the game machine 200 of the game system 700, calculates either a positive or negative change to be made to the air pressure inflating the inflatable bladder, which provides stability to the balance platform 410 of the game controller 400 of the game system 700. The calculated change to the air pressure is compared to subsequent real time air pressure measures by a compare air pressure to changed air pressure subroutine 1018 of the game program executed by the game machine 200 of the game system 700. The game machine 200 of the game system 700 then transmits control signals to the game controller 400 of the game system 700, so as to effect the calculated change to the air pressure. The game machine 200 of the game system 700 receives real time tilt data 1056 and air pressure data 1065 from the game controller 400 and real time speed data 1057 from the remote game controller with speed control 900, and transmits control signals from the game machine 200 to the game controller 400 of the game system 700 via an input/output processor 225 and a transceiver 280 of the game machine 200 of the game system 700.

Figure 11:
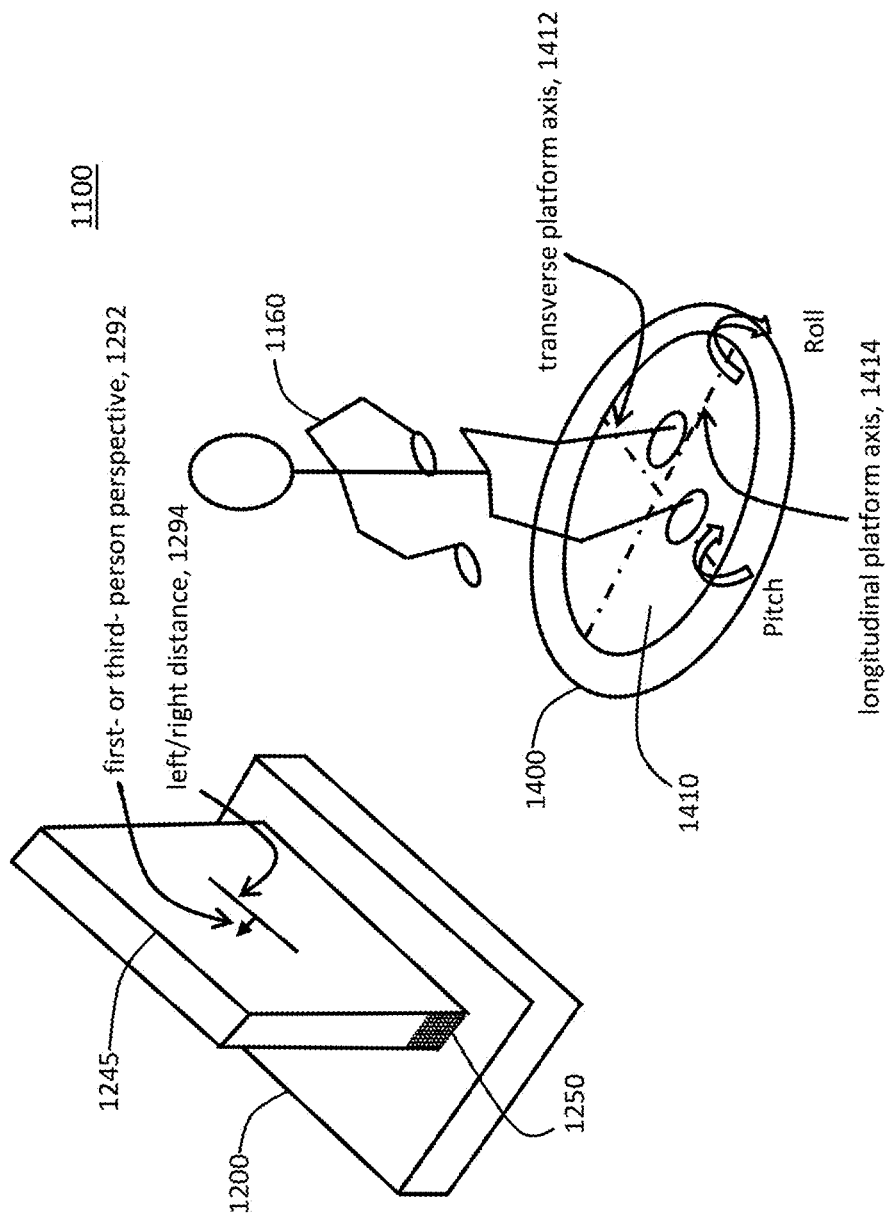
FIG. 11 is a schematic diagram illustrating a game system 1100 including a game machine 1200 that executes a stored game program, receives two tilt inputs and a load input from a game controller 1400, and provides control signals to the game controller 1400 in an embodiment of the invention.
Figure 12:
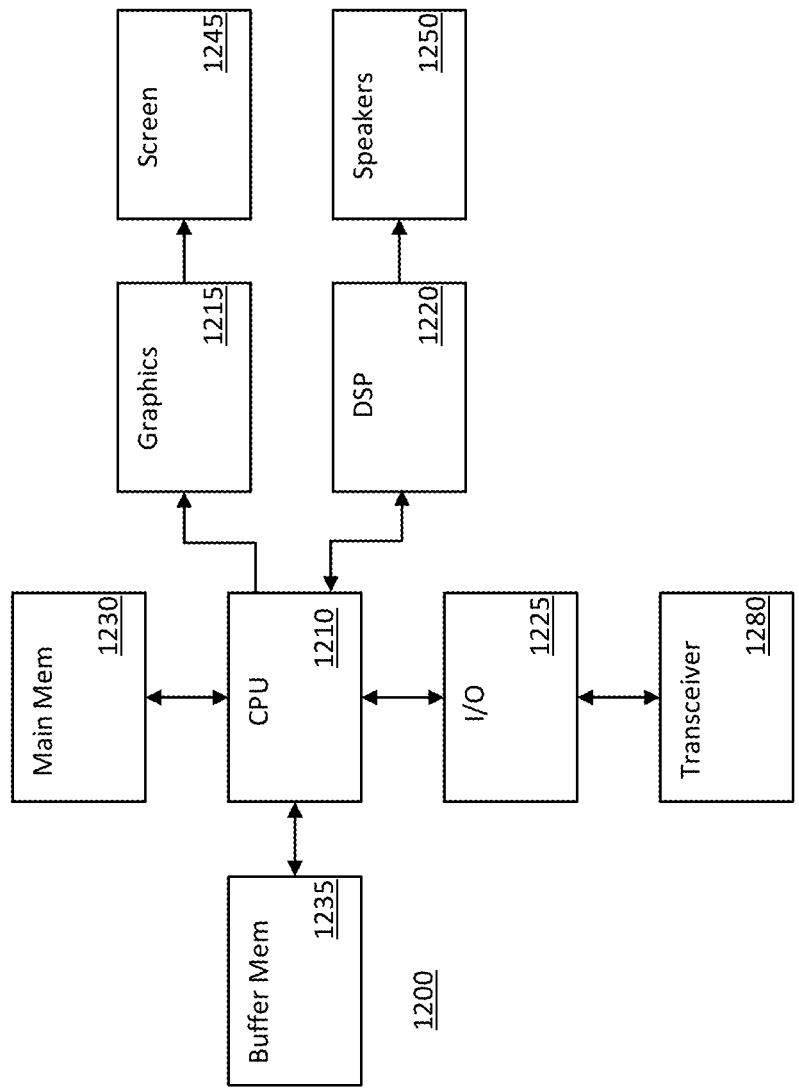
FIG. 12 is a block diagram illustrating hardware components of the game machine 1200 in the game system 100 in an embodiment of the invention.
Figure 14B:
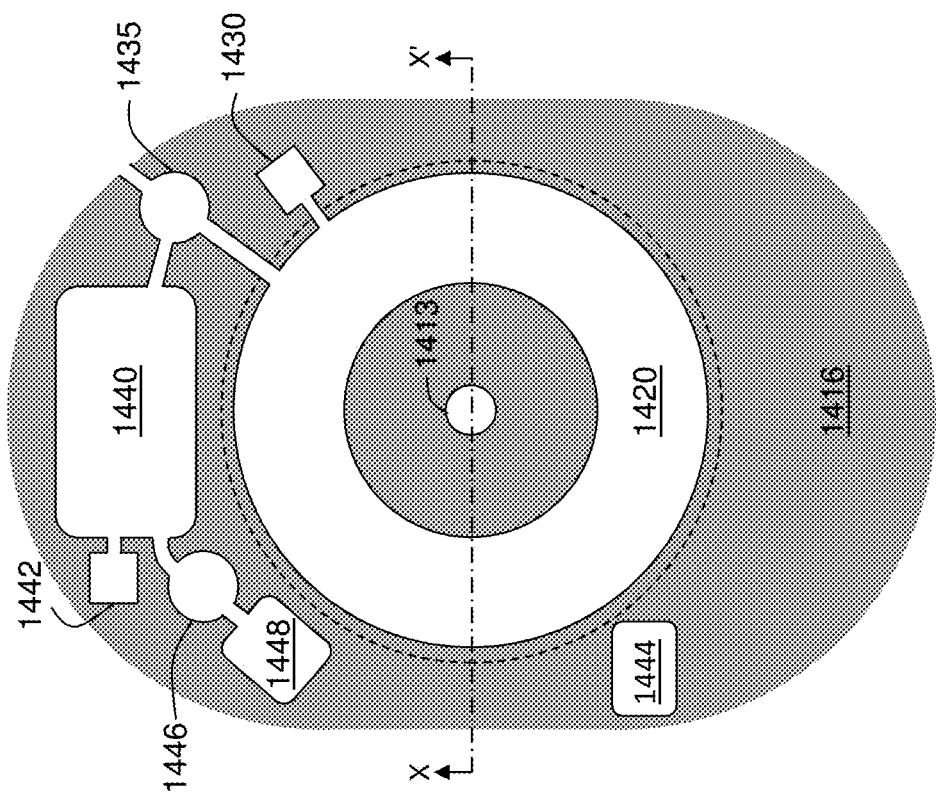
FIG. 14B is a schematic diagram illustrating a top view of the game controller 1400, having removed the balance platform, of the game system 1100 in an embodiment of the invention.
Figure 14A:
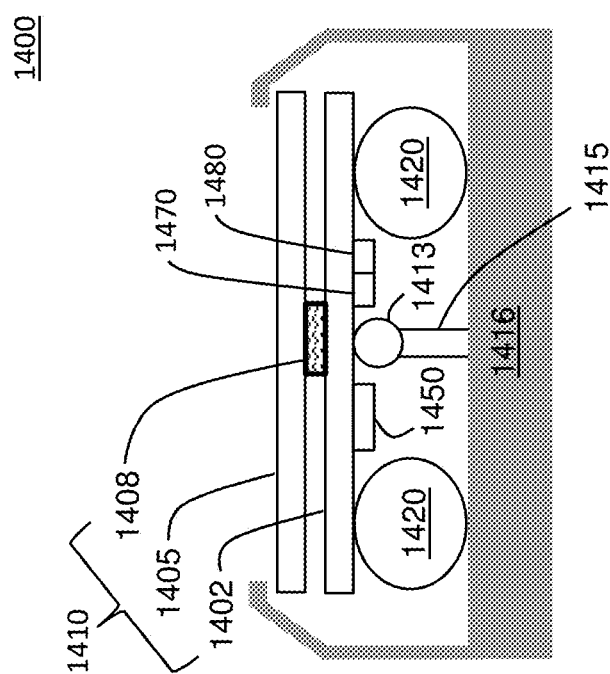
FIG. 14A is a schematic diagram illustrating a cross-section of the game controller 1400 of the game system 1100, where a balance platform of the game controller 1400 includes a load sensor, in an embodiment of the invention.

FIG. 11 is a schematic diagram illustrating a game system 1100 including a game machine 1200 and a game controller 1400 in yet another embodiment of the invention. The hardware components of the game machine 1200 of game system 1100, illustrated in FIG. 12, are similar to the hardware components of the game machine 200 of the game system 100 illustrated in FIG. 2, differing only in the central processor of the game machine 1200 of the game system 1100 receiving information from the digital signal processor related to changes in a load upon the balance platform. Most of the hardware components of the game controller 1400 of game system 1100, illustrated in FIGS. 14A and 14B, are similar to the hardware components of the game controller 400 of the game system 100, illustrated in FIGS. 4A and 4B. However, the game controller 1400 of the game system 1100 is distinguished from that of the game controller 400 of the game system 100 by a balance platform 1410 including a load cell 1408 sandwiched between an upper layer 1405 and lower layer 1402 of the balance platform 1410, so as to measure a weight of the game player prior to game play and to measure changes to the load upon the upper layer 1405 of the balance platform 1410 caused by rapid up and down movements of the game player during game play.

Referring to FIG. 11, a game player 1160 may balance on the balance platform 1410 of the game controller 1400 of game system 1100. Movements by the game player 1160 tilt the balance platform 1410, about its center point, in any direction of the horizontal plane. Similar to the game system 100 illustrated in FIG. 1, tilt is measured by rotation about the transverse x-axis 1412 of the balance platform 1410, i.e., pitch, which provides a speed in the forward-facing direction of the game player's perspective 1292 for display on the screen 1245, and about the longitudinal y-axis 1414 of the balance platform 1410, i.e., roll, which provides a distance to the left or right 1294 away from the forward-facing direction of the game player's perspective 1292. A real time dual-axis accelerometer measures the tilt of the balance platform 1410 and the real time tilt data are transmitted from the game controller 1400 to the game machine 1200. A subroutine may calculate the direction and resulting location of the game player's movements in a game space, generated by the game program, based only on the real time tilt measures of the balance platform 1410. Prior to game play, the game machine 1200 of the game system 1100 receives a measure of the game player's weight from the game controller 1400, so as to provide a comparable degree of stability of the balance platform for game players of different weights during subsequent game play. During game play, the game machine 1200 receives real time sensor data from the game controller 1400 of the game system 1100 relating to the stability of the balance platform 1410 and to real time changes to a sensed load on the balance platform 1410. The game machine 1200 of the game system 1100 outputs control signals governing the stability of the balance platform 1410 to the game controller 1400, in response to the game program identifying an interaction between the game player, who is located within the game space and an interactive graphic image generated by the game program within the same game space. The game machine 1200 of the game system 1100 also outputs audio data to speakers 1250 of the game machine 1200. Typically, the game machine 1200 and the game controller 1400 of the game system 1100 are powered by mains electricity.

Wireless transfer of data between the game machine 1200 and the game controller 1400 of the game system 1100 may utilize transceivers operating under a Bluetooth standard, a wireless LAN protocol, or an infrared communication standard. Alternatively, the game machine 1200 and the game controller 1400 of the game system 1100 may communicate via wires. Although not shown, the game machine 1200 of the game system 1100 may also receive direction and location data relating to the movements of other game players from a plurality of other game systems.

FIG. 12 is a block diagram illustrating hardware components of the game machine 1200 of the game system 1100. A central processor 1210 executes a game program and subroutines of the game program that are stored in main memory 1230. An input tilt data subroutine of the game program, executed by the game machine 1200, may request tilt data from the game controller 400 at a frequency of 10-100 Hz, and preferably at a frequency of 50 Hz. The central processor 1210 also receives processed information from the digital signal processor 1220 related to game player's weight prior to game play and to real time changes in a sensed load upon the balance platform from the load sensor 1408. A game processing subroutine issues graphics generation commands to a graphics processor 1215, which creates and displays on the screen 1245 of the game machine 1200, the game space through which a first- or third-person perspective 1292 of the game player moves in real time. The game space also contains stationary and/or moving interactive graphic images generated by the game program and the graphics processor 1215. The interactive graphic images may include any of: geographic features, environmental elements, artifacts, inhabitants, and other game players. A game processing subroutine also issues audio signal generation commands to a digital signals processor 1220 to create audio data for output to speakers 1250. The game program subroutines of the game machine 1200 receive real time tilt data, air pressure data, and load data from the game controller 1400 of the game system 1100 and transmit control signals from the game machine 1200 to the game controller 1400 via an input/output processor 1225 and a transceiver 1280.

During game play with the game system 1100, the game player's perspective moves in a sequence of consecutive moves based on the real time measures of the tilt data. An input tilt data subroutine, executed by the game machine 1200 of the game system 1100, may request tilt data from the game controller 1400 of the game system 1100 at a frequency of 10-100 Hz, and preferably at a frequency of 50 Hz. The tilt data may be stored in the buffer memory 1235 of the game machine 1200. A game player's direction and location may be calculated for each consecutive move by the game machine 1200 of the game system 1100 based on the input tilt data, as described above in game system 100. The direction and location of each moving interactive graphic image's may be calculated for each consecutive move by the game machine 1200 of the game system 1100 based on a game processing subroutine. Similarly, each of the stationary interactive graphic images is provided with direction data and location data by the game processing subroutine of the game system 1100.

Real time consecutive air pressure measures, relating to the stability of the balance platform 1410, are transmitted from the game controller 1400 to the game machine 1200 of the game system 1100. The input air pressure data subroutine may request air pressure data from the game controller 1400 of the game system 1100 at a frequency of 3-30 Hz, and preferably at a frequency of 20 Hz.

Real time load measures from the load sensor 1408 of the balance platform 1410 may measure the weight of a game player prior to game play, to provide a proportional factor by which changes to the stability of the balance platform caused by an interaction between the game player and an interactive graphic image are multiplied. The load sensor 1408 may also provide measures of a changing load on the balance platform 1410 caused by rapid up and down movement of the game player on the balance platform 1410 that may be used as timing signals during game play. An input load data subroutine may request load data from the game controller 1400 of the game system 1100 at a frequency of 3-30 Hz, and preferably at a frequency of 20 Hz.

After turning on the game machine 1200 and the game controller 1400 of the game system 1100 and prior to game play, the inflatable bladder of the game controller 1400 may be inflated to its maximum inflationary pressure, so as to maximally stabilize the balance platform 1410. The load cell 1408 sandwiched between an upper layer 1405 and a lower layer 1402 of the balance platform 1410 may be activated to then measure the load, i.e., the weight, of the game player standing at the center of the balance platform 1410. The weight of the game player is then stored in the buffer memory 1235 of the game machine 1200. The weight of the game player affects the ease with which the game player may tilt the balance platform 1410 at a particular inflationary pressure for the inflatable bladder. For example, the balance platform 1410, when supported by an inflatable bladder inflated to 12 psi, may be more easily tilted 10° by a game player weighing 180 lbs. versus a game player weighing but 100 lbs. This is because changes to the center of pressure on the balance platform 1410, caused by the game player's movements, are in part proportional to the game player's weight. The measured load or weight of the game player provides a proportional load factor by which an air pressure value and changes to an air pressure value of the inflatable bladder may be multiplied during game play, so as to more evenly match the efforts of game players of different weights in the tilting the balance platform 1410 while playing a game.

An interaction between the game player and an interactive graphic image is generated by the game program, when the game player moves to a location in proximity to the location of the interactive graphic image in the displayed game space on the screen 1245 of the game machine 1200 of the game system 1100. When the interaction is generated, an interaction's change air pressure subroutine calculates either a positive or negative change to be made to the air pressure that inflates an inflatable bladder 1420 which provides stability to the balance platform 1410 of the game controller 1400 of the game system 1100. The calculated change to the air pressure is compared to subsequent real time air pressure measures by a compare air pressure to changed air pressure subroutine of the game program of the game machine 1200 of the game system 1100, which then transmits control signals the game controller 1400 so as to effect the calculated change to the air pressure. The game program subroutines of the game machine 1200 of the game system 1100 receive real time tilt data and air pressure data from the game controller 1400 of the game system 1100 and transmit control signals from the game machine 1200 to the game controller 1400 via an input/output processor 1225 and a transceiver 1280.

The game machine 1200 of the game system 1100 may import a game program via the Internet or may read the game program contained on a compact disk. The game machine 1200 of the game system 1100 stores the game program in the main memory 1230. Typically, the game machine 1200 of the game system 1100 is powered by mains electricity.

Figure 13:
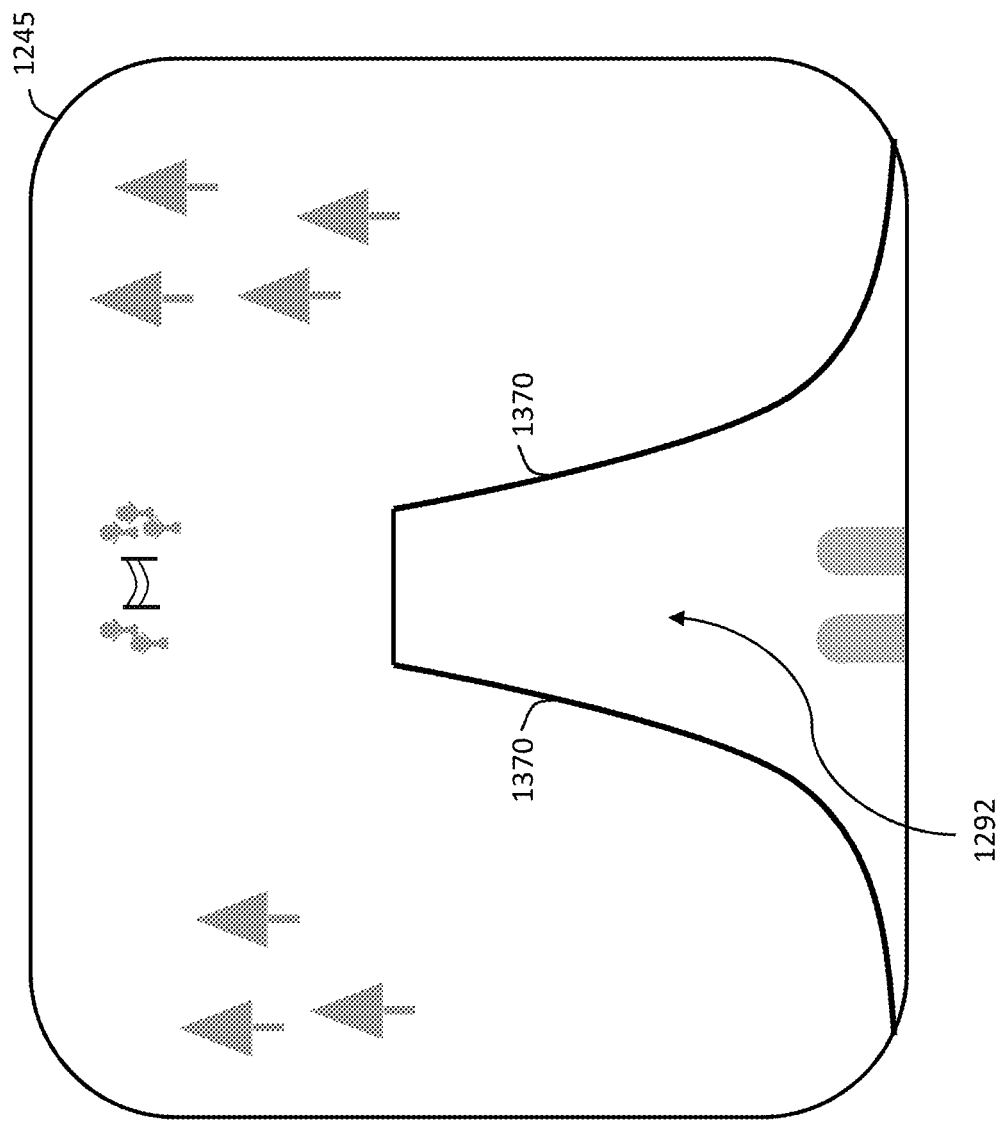
FIG. 13 is an exemplary illustration of first-person's perspective of a game player in a ski jump game displayed on a screen of the game machine 1200 of the game system 1100 in an embodiment of the invention.

FIG. 13 provides an exemplary illustration of a first-person perspective 1292 of a ski jumper at the top of a ski jump, which is displayed on the screen 1245 of the game machine 1200 of the game system 1100. The screen 1245 also displays stationary interactive graphic images 1370 of artifacts, i.e., the edges of the ski jump. According to the physics of the ski jump game, when the game player quickly assumes a tucked position, to decrease wind resistance and increase speed on the downhill run to the jump, a real time load sensor sandwiched between upper and lower layers of the balance platform 1410 may signal the start of the game player's downhill run to the game machine 1200 of the game system 1100. Near the end of the jump, the game player may quickly stand from the tucked position to signal his or her "jumping" and the assumption of an air-foil like attitude to extend the length of his or her jump. Thus, rapid changes to the load upon the balance platform 1410, caused by large up and down movements of the game player 1160, may signal the timing of events used by the physics of the game executed by the game system 1100. If the game player were to go over either of the two side edges of the ski jump, i.e., to interact with either of stationary interactive graphic images 1370, an interaction's change air pressure subroutine of the game machine 1200 may cause a rapid and total loss of stability of the balance platform 1410, reflecting the game player's wild tumbling through the air.

FIG. 14A and FIG. 14B schematically illustrate the hardware components of the game controller 1400 of the game system 1100 in yet another embodiment of the invention. FIG. 14A illustrates a cross section of the game controller 1400 through the X-X' axis, shown in FIG. 14B, while FIG. 14B illustrates a top view of the game controller 1400, where the balance platform 1410 has been removed, so as to not obscure the underlying components.

In FIG. 14A, the game controller 1400 of game system 1100 includes a balance platform 1410 that responds to moves of a game player standing on the balance platform 1410 by tilting about the balance platform's center in any direction of the horizontal plane. The balance platform 1410 further includes an upper layer 1405 upon which the game player stands, a load cell 1408 that measures the game player's weight prior to game play and large up and down movements by the game player during game play, and a lower layer 1402 that supports the load cell 1408. The load cell 1408 may be sandwiched between and disposed near the centers of the upper layer 1405 and the lower layer 1402 of the balance platform 1410. In game system 1100, the lower layer 1402 may be supported by a ball joint 1413 that is disposed on a vertical support 1415 underneath the center of the lower layer 1402 of the balance platform 1410. The vertical support 1415 and an inflatable bladder 1420, which may be toroidal in shape, may be disposed on a base 1416 of game system 1100. The inflatable bladder 1420 may encircle the vertical support 1415 and support the lower layer 1402 of the balance platform 1410 under its periphery.

In game system 1100, a dual-axis accelerometer 1450, disposed on the underside of the balance platform 1410, detects the degrees of tilt about the balance platform's transverse x-axis, i.e., pitch, and the balance platform's orthogonal longitudinal y-axis, i.e., roll, relative to the center of the balance platform 1410. A maximal degree of tilt about the balance platform's x-axis and/or y-axis may be +/−15° to +/−30°, and preferably +/−20°. An analog-to-digital converter 1470 converts, in real time, both the degree of tilt about the balance platform's transverse x-axis and the degree of tilt about the balance platform's longitudinal y-axis into digital signals for transmission to the game machine 1200 of game system 1100 via transceiver 1480 of the game controller 1400. Transmission of the tilt data may be conducted according to a Bluetooth standard, a wireless LAN protocol, or an infrared communication standard used by the game machine 1200 of game system 1100. Alternatively, transmission of the tilt data from the dual-axis accelerometer 1450 to the game machine 1200 of game system 1100 may be over wires.

Referring to FIG. 14B, an air pressure sensor 1430 of the game system 1100 measures, in real time, the air pressure of the inflatable bladder 1420. The air pressure measures of the inflatable bladder 1420 are transmitted to the game machine 1200 by transceiver 1480 of the game controller 1400, according to an input air pressure data subroutine of the game machine 1200 of the game system 1100. To change the air pressure of the inflatable bladder 1420, the game program transmits control signals to the control valve 1435 in the game controller 1400. The control valve 1435 controllably connects an air pressure source including one of: a high-pressure reservoir 1440 and an air compressor (not shown) and the inflatable bladder 1420, and the inflatable bladder 1420 and the atmosphere. When the game program of the game system 1100 transmits a positive change to the air pressure of the inflatable bladder 1420, a set of control signals opens the control valve 1435 between the air pressure source and the inflatable bladder 1420, inflating the inflatable bladder 1420 and increasing stability of the balance platform 1410, and closes the control valve 1435 between the air pressure source and the inflatable bladder 1420 when the positive change to the air pressure is effected, as measured by the air pressure sensor 1430. Alternatively, another set of control signals opens the control valve 1435 between the inflatable bladder 1420 and the atmosphere, deflating the inflatable bladder 1420 and decreasing stability of the balance platform 1410, when the game program of the game system 1100 transmits a negative change to the air pressure of the inflatable bladder 1420, and closes the control valve 1435 between the inflatable bladder 1420 and the atmosphere when the negative change to the air pressure of the inflatable bladder 1420 is effected, as measured by the air pressure sensor 1430.

As illustrated in FIG. 14B, the air pressure source of game system 1100 may include a high-pressure reservoir 1440 to quickly inflate the inflatable bladder 1420, so as to quickly increase the stability of the balance platform 1410 during game play. The high-pressure reservoir 1440 maintains a range of high air pressures that exceed the maximum inflationary air pressure of the inflatable bladder 1420. A high-pressure sensor 1442, connected to the high-pressure reservoir 1440, transmits an air pressure value of the high-pressure reservoir 1440 to a local processor 1444 of the game controller 1400 of game system 1100. The local processor 1444 may request inputs from the high pressure-sensor 1442 at a frequency of from 3-30 Hz, and preferably at 20 Hz. The local processor 1444 automatically transmits a control signal to activate an air pump 1448 and to open an input valve 1446, which is connected between the air pump 1448 and the high-pressure reservoir 1440, when the measured pressure of the high-pressure reservoir 1440 is less than the lower value of the range of high air pressures maintained by the high-pressure reservoir 1440. The air pump 1448 continues to pump air into the high-pressure reservoir 1440 until the higher value of the range of high air pressures maintained by the high-pressure reservoir 1440 is reached, at which point, the local processor 1444 transmits another control signal to shut off the air pump 1448 and to close the input valve 1446.

Figure 14C:
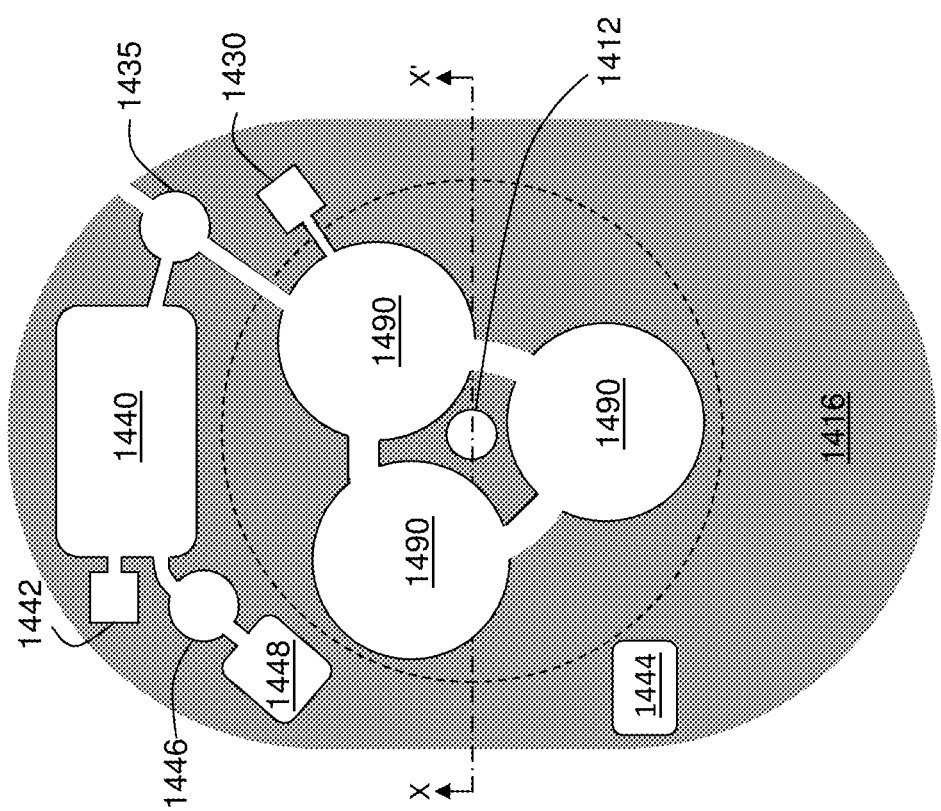
FIG. 14C is a schematic diagram illustrating a top view of the game controller 1400, having removed the balance platform, of the game system 1100 that reveals an alternative structure for the inflatable bladder in an embodiment of the invention.

As illustrated in the top view of FIG. 14C of the game controller 1400 of the game system 1100, the inflatable bladder may include at least three connected bladders 1490 to which the control valve 1435 and the air pressure sensor 1430 are connected. The reduced volume of the three connected bladders 1490, when compared to that of the toroidally-shaped inflatable bladder 1420 of FIG. 14B, may allow even more rapid inflation, and thus, even more rapid increases to the stability of the balance platform 1410 during game play with the game system 1100.

Alternatively, the air pressure source of the game controller 1400 of the game system 1100 may consist of an air compressor (not shown) that is activated by the game program when a positive change to the air pressure of the inflatable bladder 1420 is required.

Although a video game played on the game system 1100 may render a three-dimensional (3D) perspective, the game controller 1400 inputs but two variables resulting from the game player's movements, i.e., the degree of rotation about the balance platform's transverse x-axis 1412, i.e., pitch, and the degree of rotation about the balance platform's longitudinal y-axis 1414, i.e., roll. The degree of rotation about the balance platform's x-axis caused by the game player's forward and back movements corresponds to a speed of the game player in a forward-facing direction, while the degree of rotation about the balance platform's y-axis caused by the game player's left and right movements corresponds to a lateral distance to be moved by the game player away from the forward-facing direction in the 3D graphical perspective of the game space.

During game play, an input tilt data subroutine of the game program may request consecutive inputs of tilt data from the game controller 1400 of the game system 1100 at a fixed timing frequency. When the game controller 1400 receives a request for tilt data from the game machine 1200 of the game system 1100, the measures of the balance platform's tilt are transmitted from the dual-axis accelerometer 1450 to the transceiver 1480 of the game controller 1400 for transmission to the game machine 1200. Alternatively, the tilt data may be sent to the game machine 1200 of game system 1100 over wires.

The initial forward-facing direction of the game player, as displayed on the screen 1245 of the game machine 1200 of the game system 1100, further extends a line of sight between the game player and the screen 1245. The game program may assign a forward-facing direction to the initial direction of the game player's movement and coordinates $(x_0, y_0)$ to the initial location of the game player. An input tilt data subroutine of the game machine 1200 may request an input of tilt data from the game controller 1400 according to the fixed timing frequency of the subroutine. The degree of tilt about the transverse x-axis of the balance platform 1410 of the game system 1100 corresponds to a speed of the game player in the forward-facing direction of the game space. Using the fixed time interval of the fixed timing frequency, a game player's direction and location subroutine calculates from the speed, a distance to be moved in the forward-facing direction by the game player in the fixed timing interval. The degree of tilt about the longitudinal y-axis of the balance platform 1410 of the game system 1100 provides a distance to be moved laterally by the game player from the forward-facing direction in the fixed timing interval. The distance in the forward-facing direction to be moved and the lateral distance to be moved from the initial coordinates provide new coordinates, $(x_1, y_1)$, in the game space, to which the game player moves in the fixed time interval.

The direction of movement of the game player corresponds to a vector from the initial coordinates, $(x_0, y_0)$, to the new coordinates, $(x_1, y_1)$ of the game space generated by the game program executed by the game machine 1200, which may also be calculated by the game player's direction and location subroutine.

The locations of stationary interactive graphic images and the most recent locations of moving interactive graphic images are provided by a game processing program and are stored in an interaction's direction and location data of the buffer memory 1235 of the game system 1100. During game play with the game system 1100, a game processing subroutine may compare, in real time, the most recent location of the game player to the locations of stationary interactive graphic images, and to the most recent locations of moving interactive graphic images. When the central processor 1210 of the game system 1100 determines the most recent location of the game player matches, or is proximate to, the location of a stationary interactive graphic image or to the most recent calculated location of a moving interactive graphic image, an interaction's change pressure subroutine, particular to the stationary or moving interactive graphic image, is accessed to calculate a change to the air pressure of the inflatable bladder 1420, and thus, to effect a change to the stability of the balance platform 1410 on which the game player stands. The calculated change to the air pressure of the inflatable bladder 1420 is compared to the subsequent real time air pressure measures by a compare air pressure to changed air pressure subroutine of the game program, which transmits control signals to the control valve 1435 of the game controller 1400 of the game system 1100, so as to change the stability of the balance platform 1410.

The game system 1100, illustrated in FIG. 11, may also include the remote game controller 500, illustrated in FIGS. 5A and 5B, as a device for use with the game system 1100.

Referring to FIGS. 5A and 5B, as described above, the plastic housing 510 of the remote game controller 500 may form a parallelepiped that is easily held in hand of the game player in game system 1100. An on-off button 520 may provide battery power to transmit the game player's inputs from the remote game controller 500 to the game machine 1200 of the game system 1100. Prior to game play, the game player may select a particular game from a list of games displayed on the screen 1245 of game machine 1200 by using a multi-position switch 530, e.g., numeric thumbwheel switch, to select a game, while activating switch 532 may cause the identity of the selected game to be transmitted from the remote game controller 500 to the game machine 1200 of the game system 1100. Also prior to game play, the game player may select an initial stability level for the balance platform 1410 of the game controller 1400 of the game system 1100 by using a multi-position switch 540, e.g., a three-position rotary switch, to start game play with the game system 1100 with any of a higher, normal or lesser stability for the balance platform 1410. The selected stability value may be transmitted from the remote game controller 500 to the game machine 1200 of the game system 1100, when switch 542 is activated, to effect selection of the initial stability.

Activation of a momentary two-position switch 550 by the game player may provide either an increased or decreased transient speed change to the game machine 1200 of the game system 1100. The change of speed by the remote game controller 500 may be transmitted to a game processing subroutine of the game program of the game machine 1200, which proportionately changes the degree of tilt used by the game player's direction and location subroutine of the game program to yield a proportionately changed speed in the forward-facing direction of the game player.

Similarly, activation of momentary two-position switch 560 by the game player may provide either an increased or decreased transient change of air pressure to the game machine 1200 of the game system 1100. The change of air pressure by the remote game controller 500 may be transmitted to a game processing subroutine of the game program of the game system 1100, which proportionately changes the value of the air pressure, which is then compared to the subsequent real time air pressure measures by a compare air pressure to changed air pressure subroutine of the game program. The game machine 1200 then transmits control signals to the control valve 1435 of the game controller 1400 of the game system 1100, so as to transiently change the air pressure of the inflatable bladder 1420. The control valve 435 may then open between the air pressure source and the inflatable bladder 1420 for a period of time, inflating the inflatable bladder 1420 and increasing stability of the balance platform 1410, or open between the inflatable bladder 1420 and the atmosphere for a period of time, deflating the inflatable bladder 1420 and decreasing stability of the balance platform 1410.

Referring to FIG. 5B, a trigger 580 may be disposed on a lower surface of the remote game controller 500 of the game system 1100. Activation of the trigger 580 may invoke a subroutine of the game processing program of the game system 1100 that allows the game player to initiate "shooting" along the direction of movement by the game player. In this case, the subroutine of the game system 1100 may also access an interactive graphic image's location data of any of stationary artifacts, moving inhabitants, or other moving game players stored in the buffer memory 1260 of the game machine 1200 of the game system 1100.

In FIG. 5B, a transceiver 590 may be disposed within the housing 510 of the remote game controller 500 of the game system 1100. The transceiver 590 may transmit information from any of: on/off button 520, multi-position switch 530, switch 532, multi-position switch 540, switch 542, momentary two-position switch 550, momentary two-position switch 560, and trigger 580 to the game machine 1200 of the game system 1100.

Figure 15:
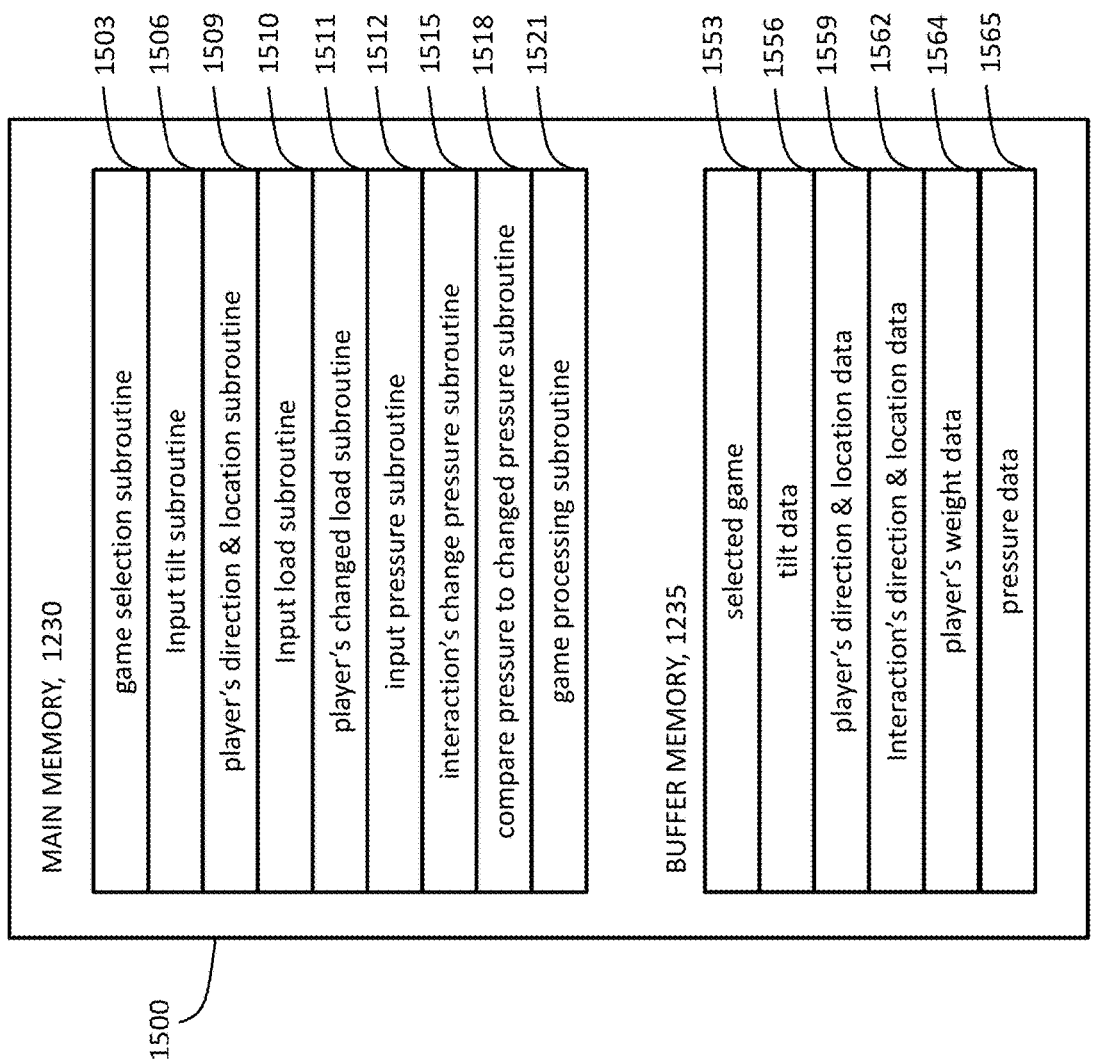
FIG. 15 is a block diagram illustrating a memory map 1500 of the game machine 1200 of the game system 1100 in an embodiment of the invention.

FIG. 15 is a block diagram of a memory map 1500 of the game machine 1200 of the game system 1100 in an embodiment of the invention. The memory map 1500 includes a subroutine memory area 1503-1521 located in the main memory 1230 of the game machine 1200 and a data memory area 1553-1565 located in the buffer memory 1235 of the game machine 1200 of the game system 1100. The game machine 1200 may load the game program including subroutines 1503-1521 from the Internet or a compact disk into main memory 1230. Additional subroutines, e.g., sound processing subroutines, that are related to the game program, but are not described in this disclosure, are also loaded into the main memory 1230.

As described above, the game player may select a game for play using the remote game controller 500 of the game system 1100. The game selection subroutine 1503, stored in main memory 1230 of the game machine 1200 of the game system 1100, may display a list of the games available to the game player on the screen 1245 of the game machine 1200. The game player may select a particular game to play, using the remote game controller 500, and the information identifying the selected game is transmitted from the remote game controller 500 to the game machine 1200, where the selected game information 1553 is stored in buffer memory 1235.

An input tilt subroutine 1506, stored in main memory 1230 of the game machine 1200 of the game system 1100, may request inputs of real time tilt measures from the game controller 1400 at a frequency of 10-100 Hz, and preferably at a frequency of 50 Hz, which is then stored as tilt data 1556 in the buffer memory 1235 of the game machine 1200. The degree of tilt about the transverse x-axis of the balance platform 1410 provides a speed of the game player in the forward-facing direction of the game space. Using the fixed time interval of the fixed timing frequency, a game player's direction and location subroutine 1509, stored in the main memory 1230, calculates from the speed, a distance to be moved in the forward-facing direction by the game player from his or her current location in the game space. Similarly, the degree of tilt about the longitudinal y-axis of the balance platform 1410 provides to the game player's direction and location subroutine 1509, a distance to be moved orthogonally by the game player, either leftward or rightward, from the current location. The distance to be moved in the forward-facing direction and the distance to be moved orthogonally provide new coordinates of a new location of the game player at the end of the time interval. The new location and the new forward-facing direction of the game player are stored as player's direction and location data 1559 in buffer memory 1235 of the game machine 1200 of the game system 1100.

An input load subroutine 1510, stored in main memory 1230 of the game machine 1200 of the game system 1100, may request inputs of the load of the game player balanced on the balance platform 1410 from the game controller 1400 at a frequency of 3-30 Hz, and preferably at a frequency of 20 Hz. Prior to game play, the input load data may be used to determine the game player's weight 1564, which is stored in the buffer memory 1235 of the game machine 1200. The player's weight data 1564 may correspond to a proportional factor subsequently used by the interaction's change pressure subroutine 1515 of the main memory 1230 to provide a comparable change to the degree of stability, i.e., a change to the inflationary air pressure of the inflatable bladder 1420, between game players of different weights with an interactive graphic image during subsequent play of the game. During game play, a game player's changed load subroutine 1511 may evaluate rapid changes to the load upon the balance platform 1410, caused by rapid up and down movements of the game player balanced on the balance platform 1410, to provide timing signals to a game processing subroutine 1521 of the game machine 1200 of the game system 1100.

Referring to FIG. 15, a game processing subroutine 152121, stored in main memory 1230 of the game machine 1200 of the game system 1100, may also provide real time direction and location data 1562 at the fixed timing frequency for both stationary and moving interactive graphic images.

An input pressure subroutine 1512, stored in the main memory 1230 of the game machine 1200 of the game system 1100, may request real time air pressure measures from the air pressure sensor 1430 connected to the inflatable bladder 1420 of the game controller 1400 at a fixed frequency. The real time air pressure measures are then stored as pressure data 1565 in the buffer memory 1235 of the game machine 1200 of the game system 1100.

An interaction between the game player and an interactive graphic image is generated by a game processing subroutine 1521 of the game program of the game machine 1200 of the game system 1100, when the game player moves to a location in proximity to the location of the interactive graphic image in the game space. When the interaction is generated, an interaction's change pressure subroutine 1515, executed by the game machine 1200 of the game system 1100, calculates either a positive or negative change to be made to the air pressure inflating the inflatable bladder 1420, using the proportional factor determined from the player's weight 1564 prior to game play. The calculated change to the air pressure is compared to subsequent real time air pressure measures by a compare air pressure to changed air pressure subroutine 1518 of the game program executed by the game machine 1200. The game machine 1400 of the game system 1100 then transmits control signals to the game controller 1400 of the game system 1100, so as to effect the calculated change to the air pressure.

Figure 16:
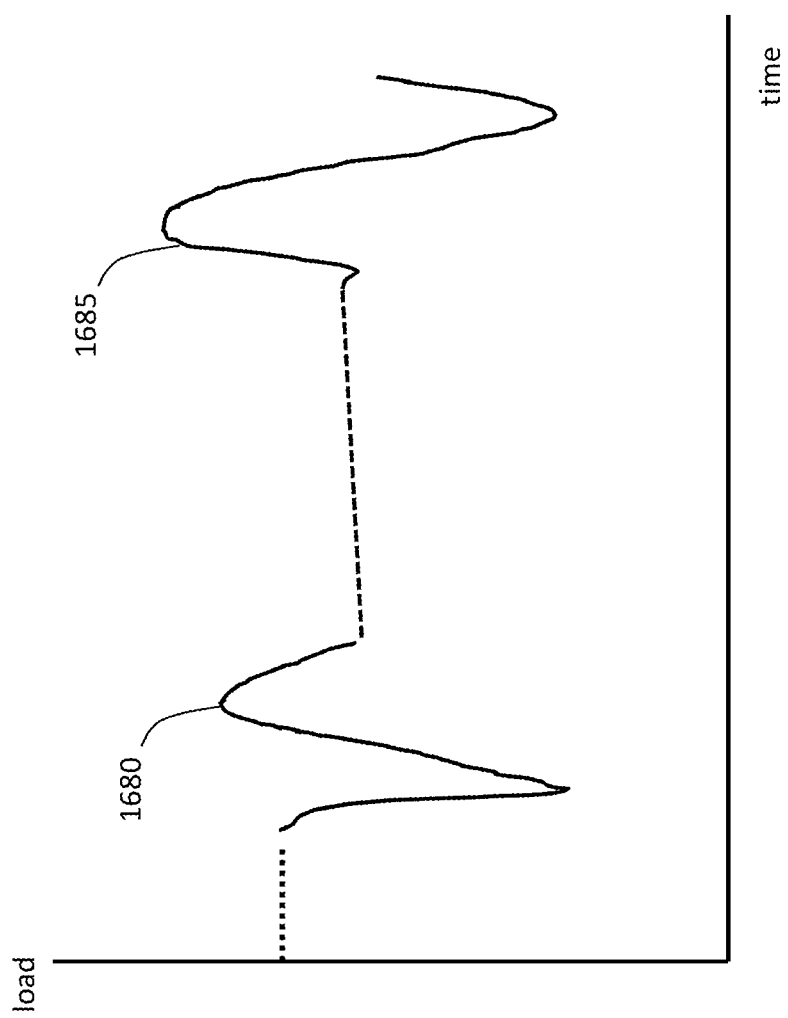
FIG. 16 illustrates exemplary changes to a load on the balance platform of the game controller 1400 caused by rapid up and down movements of the game player with the game system 1100.

FIG. 16 illustrates exemplary changes to a real time load on the balance platform 1410 caused by rapid up and down movements of the game player in the game system 1100. The real time waveform 1680, provided by the load sensor 1408 to the digital signal processor 1220 of the game machine 1200 may be associated with a game player assuming a tucked position on the balance platform 1410, while waveform 1685 may be associated with a game player standing from the tucked position to an upright position on the balance platform 1410. The digital signal processor 1220 of the game machine 1200 may use any of frequency filtering, deviations from the baseline, crossings of the baseline, inflection points, maxima and minima to process real time waveforms from the load sensor 1408 to provide timing signals associated with the game player's movement to the game program being executed by game system 1100.

Figure 17:
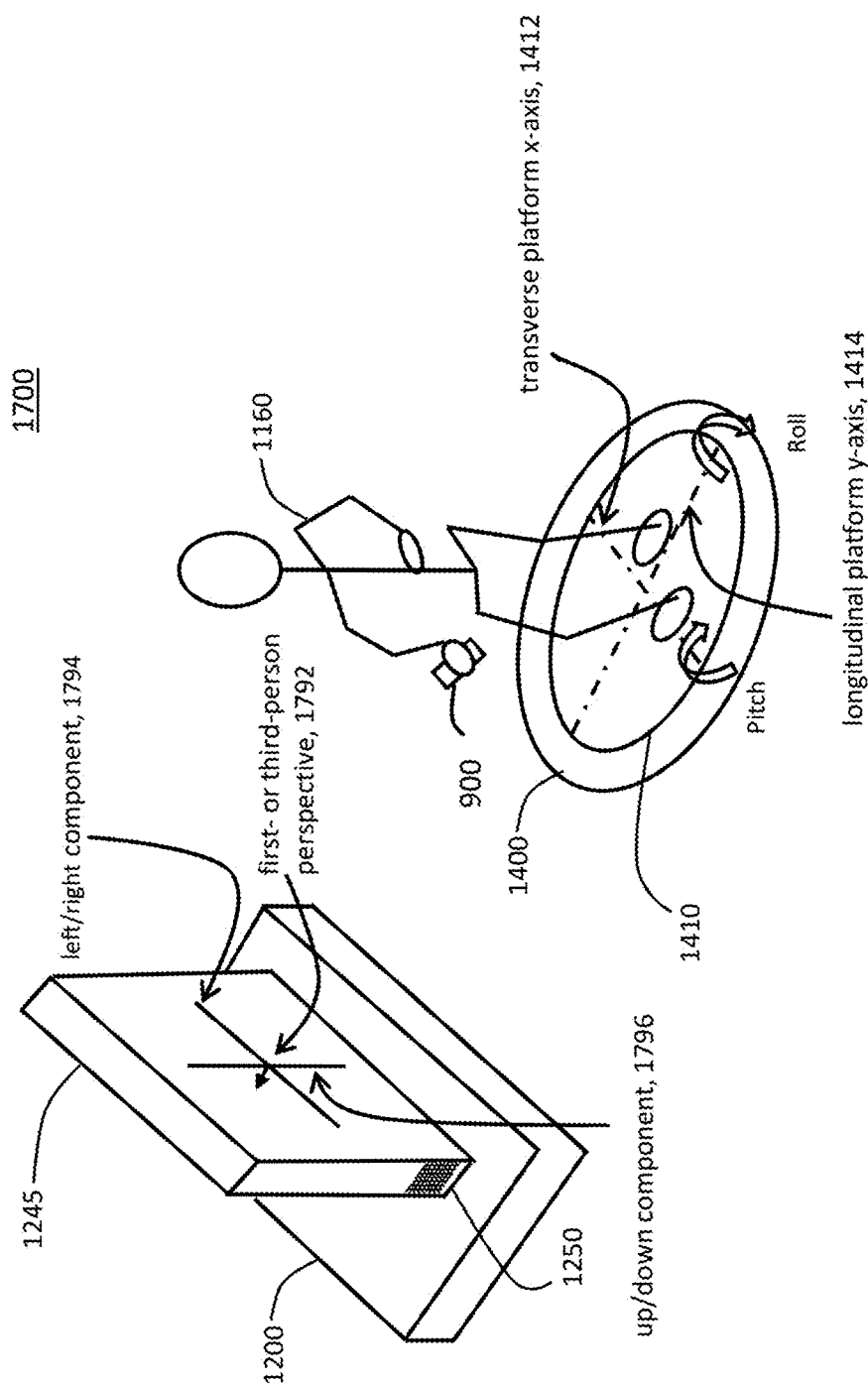
FIG. 17 is a schematic diagram illustrating a game system 1100 including a game machine 1200 that executes a stored game program, receives two tilt inputs and a load input from a game controller 1400, receives a third speed input from a remote game controller with speed control 1900, and provides control signals to the game controller 1400 in an embodiment of the invention.

FIG. 17 is a schematic diagram illustrating a game system 1700 including the game machine 1200, the game controller 1400, and the remote game controller with speed control 900 in yet another embodiment of the invention. The hardware components of the game machine 1200 of the game system 1700 are identical to the hardware components of the game machine 1200 of game system 1100 illustrated in FIG. 11, while the hardware components of the game controller 1400 are identical to the hardware components of the game controller 1400 of game system 1100 illustrated in FIG. 11. The hardware components of the remote game controller with speed control 900 of the game system 1700 are identical to the hardware components of remote game controller with speed control 900 of the game system 700 illustrated in FIGS. 9A and 9B.

In contrast to the game machine 1200 of the game system 1100, however, the software game program and subroutines executed by the game machine 1200 of the game system 1700 convert the game player's real time tilting about the balance platform's transverse x-axis 1412, i.e., pitch, and the balance platform's longitudinal y-axis 1414, i.e., roll, into two axial variables, an up/down component 1796 and a left/right component 1794, respectively, that when summed yield a forward-facing direction (not magnitude) of movement for a first- or third-person perspective 1792 of the game player to his or her next location in a sequence of consecutive moves. The game player provides via his or her remote game controller with speed control 900 in the game system 1700, a real time third axial variable, i.e., a magnitude of speed along the calculated forward-facing direction from a current location to a next location. Referring to FIG. 17, the speed of the first- or third-person perspective 1792 along the calculated forward-facing direction moves the game player a distance away from the plane of his or her current location to the next location along a third axis, i.e., a depth "into" the screen 1245 that corresponds to the third axial variable for the first- or third-person perspective 1792. Thus, the 3 input variables input by the game player allow controlled movement through a volume of a 3D game space in the game system 1700.

Referring to FIG. 17, the game player's tilting about the transverse x-axis 1412 and the longitudinal y-axis 1414 of the balance platform 1410 may be likened to a joystick control of a flight simulation game, which allows the game player to bank (tilt sideways), climb and dive, while the game player's input via the remote game controller with speed control 900 may be likened to a separate throttle control, i.e., speed control, of the flight simulation game. As described above in regard to game system 700, the physical movements of the game player on the balance platform 1410 of game system 1700 mirror the movements of the first- or third-person perspective 1792 of the game player through the volume of the 3D game space.

Unlike the flight simulation game using a joystick control, however, movements of the balance platform 1410 about the transverse x-axis 1412 and the longitudinal y-axis 1414 are subject to change in the stability of the balance platform 1410, i.e., the relative ease with which a game player may tilt the balance platform 1410, when an interaction between the game player and an interactive graphic image is generated by the game program executed by the game machine 1200 of the game system 1700.

Referring to FIG. 12 and FIG. 17, the hardware components of the game machine 1200 of the game system 1100, illustrated in FIG. 12, are identical to those of the game machine 1200 of the game system 1700 illustrated in FIG. 17. A central processor 1210 executes a game program and subroutines of the game program that are stored in main memory 1230 of the game machine 1200 of the game system 1700. To calculate movements of the game player through the 3D game space, the central processor 1210 receives tilt data from the game controller 1400, and speed data from the remote game controller with speed control 900 at the same frequency as that of the received tilt data in the game system 1700. The central processor 1210 of the game system 1700 also receives processed information from the digital signal processor 1220 related to a game player's weight prior to game play and to real time changes in a sensed load upon the balance platform 1410 during game play. A game processing subroutine issues graphics generation commands to a graphics processor 1215, which creates and displays on the screen 1245 of the game machine 1200 of the game system 1700, the 3D game space through which a first- or third-person perspective 1292 of the game player moves in real time. The 3D game space also contains stationary and/or moving interactive graphic images generated by the game program and the graphics processor 1215 of the game system 1700. The interactive graphic images may include any of: geographic features, environmental elements, artifacts, inhabitants, and other game players. A game processing subroutine also issues audio signal generation commands to a digital signals processor 1220 to create audio data for output to speakers 1250 of the game system 1700. The game program subroutines of the game machine 1200 of the game system 1700 receive real time tilt data, air pressure data, and load data from the game controller 1400 and real time speed data from the remote game controller with speed control 900. Control signals are transmitted from the game machine 1200 to the game controller 1400 of the game system 1700 to control stability of the balance platform 1410 via an input/output processor 1225 and a transceiver 1280.

During game play, the game player's perspective 1792 moves in a sequence of consecutive moves through the 3D game space based on the real time measures of the tilt data and the speed data in the game system 1700. A game player's direction and location in the 3D game space may be calculated for each consecutive move by the game machine 1200 of the game system 1700 based on the input tilt data and speed data. Similarly, the direction and location of each moving interactive graphic image in the 3D game space may be calculated for each consecutive move by the game machine 1200 of the game system 1700 based on a game processing subroutine. Direction data and location data for each of the stationary interactive graphic images may also be provided by a game processing subroutine of the game system 1700.

In the game system 1700, real time consecutive air pressure measures, relating to the stability of the balance platform 1410, are transmitted from the game controller 1400 to the game machine 1200. An input air pressure data subroutine may request air pressure data from the game controller 1400 of the game system 1700 at a frequency of 3-30 Hz, and preferably at a frequency of 20 Hz. An input load data subroutine may request load data from the game controller 1400 of the game system 1700 at a frequency of 3-30 Hz, and preferably at a frequency of 20 Hz. Real time load measures from the load sensor 1408 of the balance platform 1410 of game system 1700 may measure the weight of a game player prior to game play and may provide a proportional load factor, based on the game player's weight, by which an air pressure value and changes to an air pressure value of the inflatable bladder may be multiplied during game play, so as to more evenly match the efforts of game players of different weights in the tilting the balance platform 1410. The proportional factor may be used by an interaction's change pressure subroutine of the main memory of the game system 1700 to provide a comparable change to the degree of stability of the balance platform 1410 between game players of different weights with an interactive graphic image during subsequent game play. During game play, a game player's changed load subroutine may evaluate rapid changes to the load upon the balance platform 1410, caused by rapid up and down movements of the game player, to provide timing signals to a game processing subroutine of the game machine 1200 of the game system 1700.

The game machine 1200 of the game system 1700 may import a game program via the Internet or may read the game program contained on a compact disk. The game machine 1200 of the game system 1700 stores the game program in its main memory 1230. Typically, the game machine 1200 of the game system 1700 is powered by mains electricity.

The hardware components of the game controller 1400 of the game system 1100, illustrated in FIGS. 14A-14C, are identical to those of the game controller 1400 of the game system 1700 illustrated in FIG. 17.

Referring to FIG. 14A and FIG. 17, the game controller 1400 of game system 1700 includes a balance platform 1410 that responds to moves of a game player standing on the balance platform 1410 by tilting about the balance platform's center in any direction of the horizontal plane. The balance platform 1410 of the game system 1700 further includes an upper layer 1405 upon which the game player stands, a load cell 1408 that measures the game player's weight prior to game play and large up and down movements by the game player during game play, and a lower layer 1402 that supports the load cell 1408. The load cell 1408 may be sandwiched between and disposed near the centers of the upper layer 1405 and the lower layer 1402 of the balance platform 1410 of the game controller 1400 of the game system 1700. In game system 1700, the lower layer 1402 may be supported by a ball joint 1413 that is disposed on a vertical support 1415 underneath the center of the lower layer 1402 of the balance platform 1410. The vertical support 1415 and an inflatable bladder 1420, which may be toroidal in shape, may be disposed on a base 1416 of game system 1700. The inflatable bladder 1420 of game system 1700 may encircle the vertical support 1415 and support the lower layer 1402 of the balance platform 1410 under its periphery.

Referring to FIG. 14B and FIG. 17 for the game system 1700, a dual-axis accelerometer 1450, disposed on the underside of the balance platform 1410, detects the degrees of tilt about the balance platform's transverse x-axis, i.e., pitch, and the balance platform's orthogonal longitudinal y-axis, i.e., roll, relative to the center of the balance platform 1410. A maximal degree of tilt about the balance platform's x-axis and/or y-axis may be +/−15° to +/−30°, and preferably +/−20°. An analog-to-digital converter 1470 converts, in real time, both the degree of tilt about the balance platform's transverse x-axis and the degree of tilt about the balance platform's longitudinal y-axis into digital signals for transmission to the game machine 1200 of game system 1700 via transceiver 1480 of the game controller 1400. Transmission of the tilt data may be conducted according to a Bluetooth standard, a wireless LAN protocol, or an infrared communication standard used by the game machine 1200 of game system 1700. Alternatively, transmission of the tilt data from the dual-axis accelerometer 1450 to the game machine 1200 of game system 1700 may be over wires.

Referring to FIG. 14B and FIG. 17, an air pressure sensor 1430 of the game system 1700 measures, in real time, the air pressure of the inflatable bladder 1420. The air pressure measures of the inflatable bladder 1420 are transmitted to the game machine 1200 by transceiver 1480 of the game controller 1400, according to an input air pressure data subroutine of the game machine 1200 of the game system 1700. To change the air pressure of the inflatable bladder 1420, the game program transmits control signals to the control valve 1435 in the game controller 1400 of the game system 1700. The control valve 1435 of the game system 1700 controllably connects an air pressure source including one of: a high-pressure reservoir 1440 and an air compressor (not shown) and the inflatable bladder 1420, and the inflatable bladder 1420 and the atmosphere. When the game program of the game system 1700 transmits a positive change to the air pressure of the inflatable bladder 1420, a set of control signals opens the control valve 1435 between the air pressure source and the inflatable bladder 1420, inflating the inflatable bladder 1420 and increasing stability of the balance platform 1410, and closes the control valve 1435 between the air pressure source and the inflatable bladder 1420 when the positive change to the air pressure is effected, as measured by the air pressure sensor 1430. Alternatively, another set of control signals opens the control valve 1435 between the inflatable bladder 1420 and the atmosphere, deflating the inflatable bladder 1420 and decreasing stability of the balance platform 1410, when the game program of the game system 1700 transmits a negative change to the air pressure of the inflatable bladder 1420, and closes the control valve 1435 between the inflatable bladder 1420 and the atmosphere when the negative change to the air pressure of the inflatable bladder 1420 is effected, as measured by the air pressure sensor 1430.

As illustrated in FIG. 14B and FIG. 17, the air pressure source of game system 1700 may include a high-pressure reservoir 1440 to quickly inflate the inflatable bladder 1420, so as to quickly increase the stability of the balance platform 1410 during game play. The high-pressure reservoir 1440 of the game system 1700 maintains a range of high air pressures that exceed the maximum inflationary air pressure of the inflatable bladder 1420. A high-pressure sensor 1442, connected to the high-pressure reservoir 1440, transmits an air pressure value of the high-pressure reservoir 1440 to a local processor 1444 of the game controller 1400 of game system 1700. The local processor 1444 may request inputs from the high pressure-sensor 1442 at a frequency of from 3-30 Hz, and preferably at 20 Hz in the game system 1700. The local processor 1444 automatically transmits a control signal to activate an air pump 1448 and to open an input valve 1446, which is connected between the air pump 1448 and the high-pressure reservoir 1440, when the measured pressure of the high-pressure reservoir 1440 is less than the lower value of the range of high air pressures maintained by the high-pressure reservoir 1440 in the game system 1700. The air pump 1448 continues to pump air into the high-pressure reservoir 1440 until the higher value of the range of high air pressures maintained by the high-pressure reservoir 1440 is reached, at which point, the local processor 1444 transmits another control signal to shut off the air pump 1448 and to close the input valve 1446 of game system 1700.

As illustrated in the top view of FIG. 14C of the game controller 1400 of the game system 1700 illustrated in FIG. 17, the inflatable bladder may include at least three connected bladders 1490 to which the control valve 1435 and the air pressure sensor 1430 are connected. The reduced volume of the three connected bladders 1490, when compared to that of the toroidally-shaped inflatable bladder 1420 of FIG. 14B, may allow even more rapid inflation, and thus, even more rapid increases to the stability of the balance platform 1410 during game play with the game system 1700.

Alternatively, the air pressure source of the game controller 1400 of the game system 1700 may consist of an air compressor (not shown) that is activated by the game program when a positive change to the air pressure of the inflatable bladder 1420 is required.

After turning on the game machine 1200 and the game controller 1400 of the game system 1700 and prior to game play, the inflatable bladder 1420 of the game controller 1400 may be inflated to its maximum inflationary pressure, so as to maximally stabilize the balance platform 1410. The load cell 1408 sandwiched between an upper layer 1405 and a lower layer 1402 of the balance platform 1410 may be activated to then measure the load, i.e., the weight, of the game player standing at the center of the balance platform 1410 of the game system 1700. The weight of the game player is then stored in the buffer memory 1235 of the game machine 1200 of the game system 1700. The measured load or weight of the game player provides a proportional load factor by which an air pressure value and changes to an air pressure value of the inflatable bladder 1420 may be multiplied during game play, so as to more evenly match the efforts of game players of different weights in the tilting of the balance platform 1410 while playing a game with the game system 1700. During game play, a game player's changed load subroutine may evaluate rapid changes to the load upon the balance platform 1410, caused by rapid up and down movements of the game player balanced on the balance platform 1410, to provide timing signals to a game processing subroutine of the game machine 1200 of the game system 1700.

Referring to FIGS. 9A-9B and FIG. 17, the hardware components of the remote game controller with speed control 900 of the game system 1100, illustrated in FIGS. 9A-9B, are identical to those of the remote game controller with speed control 900 of the game system 1700 illustrated in FIG. 17. A plastic housing 910 of the remote game controller with speed control 900 of game system 1700 may form a parallelepiped that is easily held in hand of the game player.

An on-off button 920 on the upper surface of the plastic housing 910 may provide battery power to transmit the game player's inputs from the remote game controller with speed control 900 to the game machine 1200 of the game system 1700. Prior to game play, the game player may select a particular game from the list of games displayed on the screen 1245 of the game machine 1200 of the game system 1700 by using a multi-position switch 930, e.g., a numeric thumbwheel switch, on the upper surface of the plastic housing 910 of the remote game controller with speed control 900 to select a game, while depressing button 932 may cause the identity of the selected game to be transmitted from the remote game controller with speed control 900 to the game machine 1200 of the game system 1700. Also prior to game play, the game player may select an initial stability for the balance platform 1410 of the game controller 1400 of the game system 1700 by selecting a stability level associated with a position on a multi-position switch 940, e.g., a three-position rotary switch, on the upper surface of the plastic housing 910. The selected stability level of the game system 1700 corresponds to a higher, normal or lesser inflationary air pressure value for the balance platform 1410. The selected stability value may be transmitted from the remote game controller with speed control 900 to the game machine 1200 of the game system 1700, when switch 942 is activated, to effect selection of the initial stability of the balance platform 1410.

Activation of switch 950, e.g., a momentary two-position rocker-switch, on the upper surface of the plastic housing 910 by the game player may provide either an increased or decreased transient speed change to the game machine 1200 of the game system 1700. The change of speed by the remote game controller with speed control 900 may be transmitted to a game processing subroutine of the game program, which proportionately changes the speed data to yield a distance to be moved in the forward-facing direction of the game player in the game system 1700.

Similarly, activation of switch 960, e.g., another two-position rocker-switch, on the upper surface of the plastic housing 910 by the game player may provide either an increased or decreased transient change of air pressure to the game machine 1200 of game system 1700. The change of air pressure by the remote game controller with speed control 900 may be transmitted to a game processing subroutine of the game program, which proportionately changes the measure of the air pressure, which is then compared to the subsequent real time air pressure measures by a compare air pressure to changed air pressure subroutine of the game program of game system 1700. The game program of the game system 1700 then transmits control signals to the control valve 1435 of the game controller 1400, so as to transiently change the air pressure of the inflatable bladder. In the game system 1700, the control valve 1435 may then open between the air pressure source and the inflatable bladder 1420 for a period of time, inflating the inflatable bladder 1420 and increasing stability of the balance platform 1410, or open between the inflatable bladder 1420 and the atmosphere for a period of time, deflating the inflatable bladder 1420 and decreasing stability of the balance platform 1410.

A game player-controlled variable speed control 970, e.g., a single-turn potentiometer, on the upper surface of the plastic housing 910 of the remote game controller with speed control 900 may provide a variable speed in the forward-facing direction of the game player that is input to the game machine 1200 of the game system 1700 in real time. Using the fixed time interval of the fixed timing frequency, the game player's direction and location subroutine of the game system 1700 rapidly calculates from the input speed, a distance to be moved in the forward-facing direction by the game player. Thus, controllably moving the game player through the volume of the 3D game space of the game system 1700. Alternatively, the game player may wear a headset that transmits voice commands related to speed changes to the game machine 1200 of the game system 1700.

A trigger 980 may be disposed on a lower surface of the plastic housing 910 of the remote game controller with speed control 900 in the game system 1700. Activation of the trigger 980 may invoke a subroutine of the game processing program of the game system 1700 that allows the game player to initiate "shooting" along the direction of movement by the game player. In this case, the subroutine may also access an interactive graphic image's location data of any of stationary artifacts, moving inhabitants, or other moving game players stored in the buffer memory 1260 of the game machine 1200 of the game system 1700.

A transceiver 990 may be disposed within the housing 910 of the remote game controller with speed control 900 of the game system 1700. The transceiver 990 may transmit information from any of: on/off switch 920, multi-position switch 930, button 932, multi-position switch 940, button 942, momentary two-position switch 950, momentary two-position switch 960, and trigger 980 to the game machine 1200 of the game system 1700.

Figure 18:
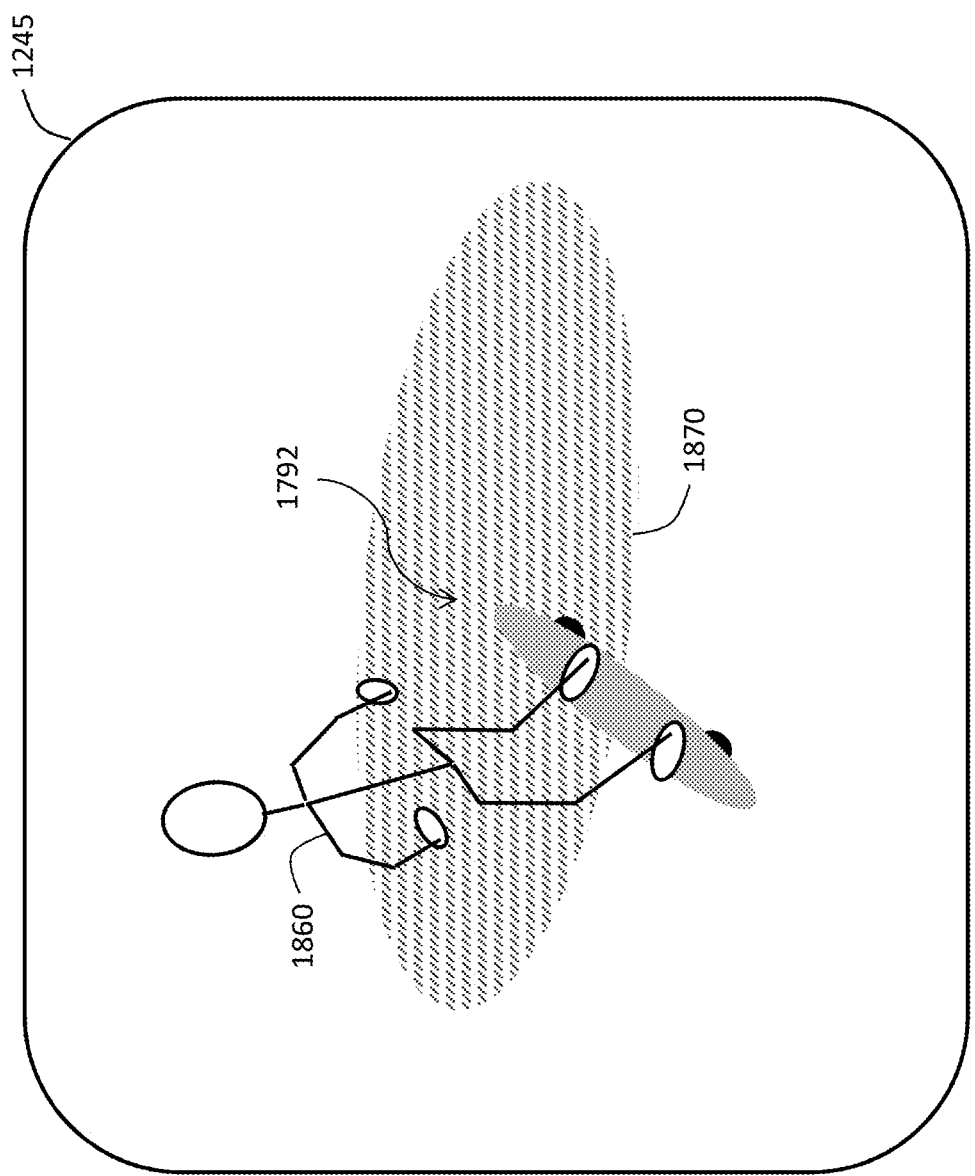
FIG. 18 is an exemplary illustration of third-person's perspective of a game player in a skateboarding game displayed on a screen of the game machine 1200 of the game system 1700 in an embodiment of the invention.

FIG. 18 provides an exemplary illustration of a third-person perspective 1792 of a skateboarder 1860 displayed on the screen 1245 of the game machine 1200 of the game system 1700. As displayed on the screen 1245 of the game machine 1200, the skateboarder 1860 is about to perform an ollie, i.e., popping into the air on the skateboard, to avoid the stationary interactive graphic image 1870 of a patch of grass, which would slow the skateboarder's speed. A rapid downward thrust of the gameplayer's back leg to the balance platform 1410 may provide a change to the gameplayer's load, i.e., a timing signal, on the balance platform 1410 that is detected by the load sensor 1408 of the game controller 1400 of the game system 1700, which would then—according to the physics of the skateboarding game—initiate a pre-programmed display of a successful ollie by the displayed skateboarder. The digital signal processor 1220 of the game machine 1200 of the game system 1700 may use any of frequency filtering, deviations from the baseline, crossings of the baseline, inflection points, maxima and minima to process real time waveforms from the load sensor 1408 of the game controller 1400 of the game system 1700 to provide timing signals associated with the game player's movement to the game program being executed by game system 1700.

Figure 19:
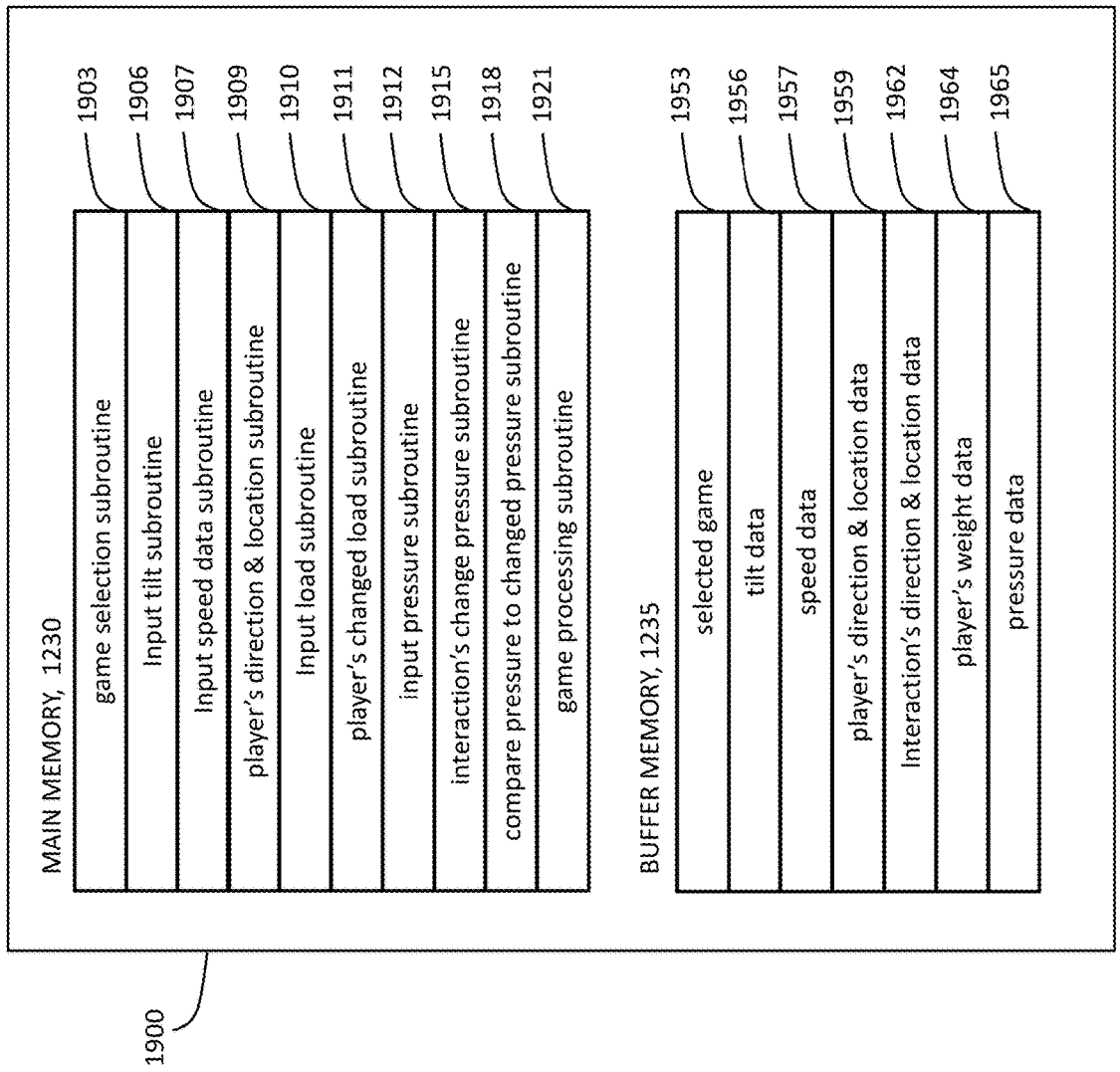
FIG. 19 illustrating a memory map 1900 of the game machine 1200 of the game system 1700 in an embodiment of the invention.

FIG. 19 is a block diagram of a memory map 1900 of the game machine 1200 of the game system 1700 in an embodiment of the invention. The memory map 1900 includes a subroutine memory area 1903-1921 located in the main memory 1230 of the game machine 1200 and a data memory area 1953-1965 located in the buffer memory 1235 of the game machine 1200 of the game system 1700. The game machine 1200 may load the game program including subroutines 1903-1921 from the Internet or a compact disk into main memory 1230 of the game system 1700. Additional subroutines, e.g., sound processing subroutines, that are related to the game program, but are not described in this disclosure, are also loaded into the main memory 1230 of the game system 1700.

As described above, the game player may select a game for play using the remote game controller with speed control 900 of the game system 1700. The game selection subroutine 1903, stored in main memory 1230 of the game machine 1200 of the game system 1700, may display a list of the games available to the game player on the screen 1245 of the game machine 1200. The game player may select a particular game to play, using the remote game controller with speed control 900, and the information identifying the selected game is transmitted from the remote game controller 900 to the game machine 1200 of the game system 1700, where the selected game information 1953 is stored in buffer memory 1235.

An input tilt data subroutine 1906 and an input speed data subroutine 1907 of the game program of the game system 1700 request tilt data from the game controller 1400 and speed data from the remote game controller with speed control 900 at a frequency of 10-100 Hz, and preferably at a frequency of 50 Hz. The tilt data 1956 and the speed data 1957 are then stored in the buffer memory 1235 of the game machine 1200 of the game system 1700. Using the real time tilt data 1956 and speed data 1957, a game player's direction and location subroutine 1909, executed by the game machine 1200 of the game system 1700, may calculate the direction of each consecutive move to its resulting location for the next fixed timing interval. The calculated direction and the resulting location of each game player's move are then stored as game player's direction and location data 1959 in the buffer memory 1235 of the game machine 1200 of the game system 1700.

An input load subroutine 1910, stored in main memory 1230 of the game machine 1200 of the game system 1700, may request inputs of the load of the game player balanced on the balance platform 1410 from the game controller 1400 at a frequency of 3-30 Hz, and preferably at a frequency of 20 Hz. Prior to game play, the input load data may be used to determine the game player's weight 1964, which is stored in the buffer memory 1235 of the game machine 1200. The game player's weight data 1964 may correspond to a proportional factor subsequently used by the interaction's change pressure subroutine 1915 of the main memory 1230 to provide a comparable change to the degree of stability, i.e., a change to the inflationary air pressure of the inflatable bladder 1420, between game players of different weights with an interactive graphic image during subsequent play of the game. During game play, a game player's changed load subroutine 1911 may evaluate rapid changes to the load upon the balance platform 1410, caused by rapid up and down movements of the game player balanced on the balance platform 1410, to provide timing signals to a game processing subroutine 1921 of the game machine 1200 of the game system 1700.

Referring to FIG. 19, a game processing subroutine 192121, stored in main memory 1230 of the game machine 1200 of the game system 1700, may also provide real time direction and location data 1962 at the fixed timing frequency for both stationary and moving interactive graphic images.

An input pressure subroutine 1912, stored in the main memory 1230 of the game machine 1200 of the game system 1700, may request real time air pressure measures from the air pressure sensor 1430 connected to the inflatable bladder 1420 of the game controller 1400 at a fixed frequency. The real time air pressure measures are then stored as pressure data 1965 in the buffer memory 1235 of the game machine 1200 of the game system 1700.

An interaction between the game player and an interactive graphic image is generated by a game processing subroutine 1921 of the game program of the game machine 1200 of the game system 1700, when the game player moves to a location in proximity to the location of the interactive graphic image in the game space. When the interaction is generated, an interaction's change air pressure subroutine 1915, executed by the game machine 1200 of the game system 1700, calculates either a positive or negative change to be made to the air pressure inflating the inflatable bladder 1420, using the proportional factor determined from the player's weight 1964 prior to game play. The calculated change to the air pressure is compared to subsequent real time air pressure measures by a compare air pressure to changed air pressure subroutine 1918 of the game program executed by the game machine 1200 of the game system 1700. The game machine 1400 of the game system 1700 then transmits control signals to the game controller 1400 of the game system 1700, so as to effect the calculated change to the air pressure.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A game system, comprising:
   a game controller, including:
      a balance platform supported under its center, the balance platform tilting in all directions of the horizontal plane in response to changes to a center of pressure caused by a game player balancing on the balance platform;
      an inflatable bladder supporting the balance platform under its periphery;
      an air pressure source controllably inflating the inflatable bladder;
      a dual-axis accelerometer measuring tilt of the balance platform in real time;
      a control valve controllably connecting one of: an air pressure source and the inflatable bladder, and the inflatable bladder and the atmosphere; and
      an air pressure sensor measuring air pressure of the inflatable bladder in real time; and a game machine, including:
  a screen; and
  a central processor executing a game program that receives measures of the air pressure of the inflatable bladder from the air pressure sensor and the tilt of the balance platform from the dual-axis accelerometer, displays on the screen a game player's location in a game space based on measures of the tilt, and controllably changes the air pressure of the inflatable bladder by the control valve during game play in response to the game program generating an interaction between the game player's location and a location of an interactive graphic image created by the game program, the game program transmitting to the game controller one of:
  first control signals for a first interaction that generate a positive change to the air pressure by opening the control valve between the air pressure source and the inflatable bladder, inflating the inflatable bladder and increasing stability of the balance platform, and closing the control valve between the air pressure source and the inflatable bladder when the positive change to the air pressure is effected, as measured by the air pressure sensor; and
  second control signals for a second interaction that generate a negative change to the air pressure by opening the control valve between the inflatable bladder and the atmosphere, deflating the inflatable bladder and decreasing the stability of the balance platform, and closing the control valve between the inflatable bladder and the atmosphere when the negative change to the air pressure is effected, as measured by the air pressure sensor.

2. The game controller of the game system of claim 1, real time measures of the tilt of the balance platform including:
a first degree of rotation about the balance platform's transverse x-axis that corresponds to a speed of the game player's location in a forward-facing direction of movement through the game space generated by the game program, and
a second degree of rotation about the balance platform's longitudinal y-axis that corresponds to a distance to be moved laterally to the right or to the left from the forward-facing direction of the game player's location through the game space.

3. The game controller of the game system of claim 1, the air pressure source including:
  a high-pressure reservoir:
  a high-pressure sensor connected to the high-pressure reservoir;
  an air pump;
  a controllable input valve connected between the air pump and the high-pressure reservoir; and
  a local processor receiving high air pressure measures from the high-pressure sensor in real time, the local processor automatically activating the air pump and opening the input valve to pump air into the high-pressure reservoir, when the high-pressure sensor measures a first high air pressure less than a lowest value of a range of high air pressures maintained by the high-pressure reservoir, and automatically de-activating the air pump and closing the input valve, when the high-pressure sensor measures a second high air pressure equal to a highest value of the range of high air pressures maintained by the high-pressure reservoir.

4. The game controller of the game system of claim 1, a maximal degree of tilt measured by the dual-axis accelerometer in any direction of the horizontal plane being +/−15° to +/−30°, and preferably +/−20°.

5. The game system of claim 1, further comprising a remote game controller, including:
  a housing forming a parallelepiped that is held in hand by the game player;
  an on/off switch that powers the remote game controller;
  a multi-position game selection switch;
  a multi-position initial stability level switch;
  a trigger that allows the game player to shoot along a forward-facing direction of the game player in the game space; and
  a transceiver that transmits information from any of the on/off switch, the multi-position game selection switch, the multi-position initial stability level switch, and the trigger to the game machine.

6. A game system, comprising:
a game controller, including:
  a balance platform supported under its center, the balance platform tilting in all directions of the horizontal plane in response to changes to a center of pressure caused by a game player balancing on the balance platform;
  an inflatable bladder supporting the balance platform under its periphery;
  an air pressure source controllably inflating the inflatable bladder;
  a dual-axis accelerometer measuring tilt about the balance platform in real time;
  a control valve controllably connecting one of: an air pressure source and the inflatable bladder, and the inflatable bladder and the atmosphere; and
  an air pressure sensor measuring air pressure of the inflatable bladder in real time;
a remote game controller with speed control that is held in hand by the game player, the remote game controller with speed control including a game player-controlled variable speed control that operates in real time; and
a game machine, including:
  a screen; and
  a central processor executing a game program that receives real time measures of the air pressure of the inflatable bladder from the air pressure sensor, the tilt of the balance platform from the dual-axis accelerometer, and a game player-controlled variable speed from the game player-controlled variable speed control, the game program displaying on the screen a game player's location in a 3-dimensional (3D) game space based on measures of the tilt and of the game player-controlled variable speed, and controllably changing the air pressure of the inflatable bladder by the control valve during game play in response to the game program generating an interaction between the game player's location and a location of an interactive graphic image created by the game program, the game program transmitting to the game controller one of:
  first control signals for a first interaction that generate a positive change to the air pressure by opening the control valve between the air pressure source and the inflatable bladder, inflating the inflatable bladder and increasing stability of the balance platform, and closing the control valve between the air pressure source and the inflatable bladder when the positive change to the air pressure is effected, as measured by the air pressure sensor; and second control signals for a second interaction that generate a negative change to the air pressure by opening the control valve between the inflatable bladder and the atmosphere, deflating the inflatable bladder and decreasing the stability of the balance platform, and closing the control valve between the inflatable bladder and the atmosphere when the negative change to the air pressure is effected, as measured by the air pressure sensor.

7. The game system of claim 6,
the dual-axis accelerometer of the game controller providing real time measures of the tilt of the balance platform including: a first degree of rotation about the balance platform's transverse x-axis that corresponds to an up/down component of the game player's forward-facing direction of movement through the 3D game space and a second degree of rotation about the balance platform's longitudinal y-axis that corresponds to a left/right component of the game player's forward-facing direction of movement through the 3D game space, a sum of the up/down and left/right components providing the forward-facing direction (not magnitude) of a game player's movement through the 3D game space, and
the remote game controller with speed control providing a game player-controlled variable speed for the game player along the forward-facing direction of the game player's movement through the 3D game space.

8. The game controller of the game system of claim 6, the air pressure source including:
a high-pressure reservoir:
a high-pressure sensor connected to the high-pressure reservoir;
an air pump;
a controllable input valve connected between the air pump and the high-pressure reservoir; and
a local processor receiving high air pressure measures from the high-pressure sensor in real time, the local processor automatically activating the air pump and opening the input valve to pump air into the high-pressure reservoir, when the high-pressure sensor measures a first high air pressure less than a lowest value of a range of high air pressures maintained by the high-pressure reservoir, and automatically de-activating the air pump and closing the input valve, when the high-pressure sensor measures a second high air pressure equal to a highest value of the range of high air pressures maintained by the high-pressure reservoir.

9. The game controller of the game system of claim 6, a maximal degree of tilt measured by the dual-axis accelerometer in any direction of the horizontal plane being +/−15° to +/−30°, and preferably +/−20°.

10. The remote game controller with speed control of the game system of claim 6, further including:
a housing forming a parallelepiped;
an on/off switch that powers the remote game controller with speed control;
a multi-position game selection switch;
a multi-position initial stability level switch;
a trigger that allows the game player to shoot along a forward-facing direction of the game player in the game space; and
a transceiver that transmits information from any of the on/off switch, the multi-position game selection switch, the multi-position initial stability level switch, the trigger, and the game player-controlled variable speed control to the game machine.

11. A game system, comprising:
a game controller, including:
a balance platform supported under its center, the balance platform tilting in all directions of the horizontal plane in response to changes to a center of pressure caused by a game player balancing on the balance platform, the balance platform including an upper layer, a lower layer, and a load cell sandwiched between the upper layer and the lower layer;
an inflatable bladder supporting the balance platform under its periphery;
an air pressure source controllably inflating the inflatable bladder;
a dual-axis accelerometer measuring tilt of the balance platform in real time;
a control valve controllably connecting one of: an air pressure source and the inflatable bladder, and the inflatable bladder and the atmosphere;
an air pressure sensor measuring air pressure of the inflatable bladder in real time; and
the load cell measuring a load on the balance platform resulting from the game player balancing on the balance platform in real time; and
a game machine, including:
a screen; and
a central processor executing a game program that receives real time measures of the air pressure of the inflatable bladder from the air pressure sensor, the tilt of the balance platform from the dual-axis accelerometer, and the load on the balance platform from the load cell, the game program displaying on the screen a game player's location in a game space based on measures of the tilt, and controllably changing the air pressure of the inflatable bladder by a proportional load factor, based on the load of the game player prior to game play, via the control valve during game play in response to the game program generating an interaction between the game player's location and a location of an interactive graphic image created by the game program, the game program transmitting to the game controller one of:
first control signals for a first interaction that generate a positive change to the air pressure, based on the proportional load factor, by opening the control valve between the air pressure source and the inflatable bladder, inflating the inflatable bladder and increasing stability of the balance platform, and closing the control valve between the air pressure source and the inflatable bladder when the positive change to the air pressure, based on the proportional load factor, is effected, as measured by the air pressure sensor; and
second control signals for a second interaction that generate a negative change to the air pressure, based on the proportional load factor, by opening the control valve between the inflatable bladder and the atmosphere, deflating the inflatable bladder and decreasing the stability of the balance platform, and closing the control valve between the inflatable bladder and the atmosphere when the negative change to the air pressure, based on the proportional load factor, is effected, as measured by the air pressure sensor.

12. The game controller of the game system of claim 11, real time measures of the tilt of the balance platform including: a first degree of rotation about the balance platform's transverse x-axis that corresponds to a speed of the game player's location in a forward-facing direction of movement through the game space generated by the game program, and a second degree of rotation about the balance platform's longitudinal y-axis that corresponds to a distance to be moved laterally to the right or to the left from the forward-facing direction of the game player's location through the game space.

13. The game controller of the game system of claim 11, the air pressure source including:
   a high-pressure reservoir:
   a high-pressure sensor connected to the high-pressure reservoir;
   an air pump;
   a controllable input valve connected between the air pump and the high-pressure reservoir; and
   a local processor receiving high air pressure measures from the high-pressure sensor in real time, the local processor automatically activating the air pump and opening the input valve to pump air into the high-pressure reservoir, when the high-pressure sensor measures a first high air pressure less than a lowest value of a range of high air pressures maintained by the high-pressure reservoir, and automatically de-activating the air pump and closing the input valve, when the high-pressure sensor measures a second high air pressure equal to a highest value of the range of high air pressures maintained by the high-pressure reservoir.

14. The game controller of the game system of claim 11, a real time load sensor of the balance platform detecting rapid up and down changes to the load of the game player upon the balance platform during game play, the rapid up and down changes to the load being transmitted to the game machine for processing, the processing identifying the rapid up and down changes to the load as timing signals used during game play.

15. The game system of claim 11, further comprising a remote game controller, including:
   a housing forming a parallelepiped that is held in hand by the game player;
   an on/off switch that powers the remote game controller;
   a multi-position game selection switch;
   a multi-position initial stability level switch;
   a trigger that allows the game player to shoot along the forward-facing direction of the game player in the game space; and
   a transceiver that transmits information from any of the on/off switch, the multi-position game selection switch, the multi-position initial stability level switch, and the trigger to the game machine.

16. A game system, comprising:
   a game controller, including:
      a balance platform supported under its center, the balance platform tilting in all directions of the horizontal plane in response to changes to a center of pressure caused by a game player balancing on the balance platform, the balance platform including an upper layer, a lower layer, and a load cell sandwiched between the upper layer and the lower layer;
      an inflatable bladder supporting the balance platform under its periphery;
      an air pressure source controllably inflating the inflatable bladder;
      a dual-axis accelerometer measuring tilt of the balance platform in real time;
      a control valve controllably connecting one of: an air pressure source and the inflatable bladder, and the inflatable bladder and the atmosphere;
      an air pressure sensor measuring air pressure of the inflatable bladder in real time; and
      the load cell measuring a load on the balance platform resulting from the game player balancing on the balance platform in real time;
   a remote game controller with speed control that is held in hand by the game player, the remote game controller with speed control including a game player-controlled variable speed control that operates in real time; and
   a game machine, including:
      a screen; and
      a central processor executing a game program that receives real time measures of the air pressure of the inflatable bladder from the air pressure sensor, the tilt of the balance platform from the dual-axis accelerometer, the load on the balance platform from the load cell, and a game player-controlled variable speed from the game player-controlled variable speed control, the game program displaying on the screen a game player's location in a 3-dimensional (3D) game space based on measures of the tilt and of the game player-controlled variable speed, and controllably changing the air pressure of the inflatable bladder by a proportional load factor, based on the load of the game player prior to game play, via the control valve during game play in response to the game program generating an interaction between the game player's location and a location of an interactive graphic image created by the game program, the game program transmitting to the game controller one of:
      first control signals for a first interaction that generate a positive change to the air pressure, based on the proportional load factor, by opening the control valve between the air pressure source and the inflatable bladder, inflating the inflatable bladder and increasing stability of the balance platform, and closing the control valve between the air pressure source and the inflatable bladder when the positive change to the air pressure, based on the proportional load factor, is effected, as measured by the air pressure sensor; and
      second control signals for a second interaction that generate a negative change to the air pressure, based on the proportional load factor, by opening the control valve between the inflatable bladder and the atmosphere, deflating the inflatable bladder and decreasing the stability of the balance platform, and closing the control valve between the inflatable bladder and the atmosphere when the negative change to the air pressure, based on the proportional load factor, is effected, as measured by the air pressure sensor.

17. The game system of claim 16,
the dual-axis accelerometer of the game controller providing real time measures of the tilt of the balance platform including: a first degree of rotation about the balance platform's transverse x-axis that corresponds to an up/down component of the game player's forward-facing direction of movement through the 3D game space and a second degree of rotation about the balance platform's longitudinal y-axis that corresponds to a left/right component of the game player's forward-facing direction of movement through the 3D game space, a sum of the up/down and left/right components providing the forward-facing direction (not magnitude) of a game player's movement through the 3D game space, and the remote game controller with speed control providing a game player-controlled variable speed for the game player along the forward-facing direction of the game player's movement through the 3D game space.

18. The game controller of the game system of claim 16, a real time load sensor of the balance platform detecting rapid up and down changes to the load of the game player upon the balance platform during game play, the rapid up and down changes to the load being transmitted to the game machine for processing, the processing identifying the rapid up and down changes to the load as timing signals used during game play.

19. The game controller of the game system of claim 16, the air pressure source including:
- a high-pressure reservoir:
- a high-pressure sensor connected to the high-pressure reservoir;
- an air pump;
- a controllable input valve connected between the air pump and the high-pressure reservoir; and
- a local processor receiving high air pressure measures from the high-pressure sensor in real time, the local processor automatically activating the air pump and opening the input valve to pump air into the high-pressure reservoir, when the high-pressure sensor measures a first high air pressure less than a lowest value of a range of high air pressures maintained by the high-pressure reservoir, and automatically de-activating the air pump and closing the input valve, when the high-pressure sensor measures a second high air pressure equal to a highest value of the range of high air pressures maintained by the high-pressure reservoir.

20. The remote game controller with speed control of the game system of claim 16, further including:
- a housing forming a parallelepiped;
- an on/off switch that powers the remote game controller with speed control;
- a multi-position game selection switch;
- a multi-position initial stability level switch;
- a trigger that allows the game player to shoot along the forward-facing direction of the game player in the game space; and
- a transceiver that transmits information from any of the on/off switch, the multi-position game selection switch, the multi-position initial stability level switch, the trigger, and the game player-controlled variable speed control to the game machine.

* * * * *